United States Patent
Yamamoto et al.

(10) Patent No.: US 12,195,619 B2
(45) Date of Patent: Jan. 14, 2025

(54) FLUORINE-CONTAINING POLYMER AND SURFACE TREATMENT AGENT

(71) Applicant: DAIKIN INDUSTRIES, LTD., Osaka (JP)

(72) Inventors: Yuuki Yamamoto, Osaka (JP); Norimasa Uesugi, Osaka (JP); Ikuo Yamamoto, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 919 days.

(21) Appl. No.: 17/225,666

(22) Filed: Apr. 8, 2021

(65) Prior Publication Data

US 2021/0221995 A1 Jul. 22, 2021

Related U.S. Application Data

(63) Continuation of application No. PCT/JP2019/039857, filed on Oct. 9, 2019.

(30) Foreign Application Priority Data

Oct. 10, 2018 (JP) .................................. 2018-191632

(51) Int. Cl.

| | |
|---|---|
| C08L 33/14 | (2006.01) |
| C08F 220/22 | (2006.01) |
| C08F 220/24 | (2006.01) |
| C08F 220/34 | (2006.01) |
| C08F 220/36 | (2006.01) |
| C08F 220/56 | (2006.01) |
| C08L 33/16 | (2006.01) |
| C09D 133/16 | (2006.01) |

(52) U.S. Cl.
CPC ............ C08L 33/14 (2013.01); C08F 220/22 (2013.01); C08F 220/36 (2013.01); C09D 133/16 (2013.01)

(58) Field of Classification Search
CPC ........ C08L 33/14; C08L 33/16; C08F 220/22; C08F 220/36; C08F 220/56; C08F 220/24; C08F 220/34; C09D 133/16
See application file for complete search history.

(56) References Cited

U.S. PATENT DOCUMENTS

| | | |
|---|---|---|
| 8,552,106 B2 | 10/2013 | Yamamoto et al. |
| 9,470,977 B2 | 10/2016 | Kamiya et al. |
| 2006/0263720 A1 | 11/2006 | Mori |
| 2009/0030143 A1 | 1/2009 | Yamamoto et al. |
| 2011/0124803 A1 | 5/2011 | Yamamoto et al. |
| 2015/0198884 A1 | 7/2015 | Kamiya et al. |
| 2017/0158850 A1 | 6/2017 | Knaup et al. |

FOREIGN PATENT DOCUMENTS

| | | |
|---|---|---|
| CN | 104844759 A | 8/2015 |
| JP | 2004-359796 A | 12/2004 |
| JP | 2007-017948 A | 1/2007 |
| JP | 2008-33148 A | 2/2008 |
| JP | 2008-542449 A | 11/2008 |
| JP | 2010-138256 A | 6/2010 |
| JP | 2011-516617 A | 5/2011 |
| JP | 2012-050528 A | 3/2012 |
| JP | 2013-136687 A | 7/2013 |
| JP | 2014-079960 A | 5/2014 |
| JP | 2015-166465 A | 9/2015 |
| WO | 2017/145918 A1 | 8/2017 |

OTHER PUBLICATIONS

Machine translation of CN 104844759. (Year: 2015).*
International Preliminary Report on Patentability issued Apr. 8, 2021 with translation of the Written Opinion in International Application No. PCT/JP2019/039857.
Extended European Search Report issued Jun. 27, 2022 in European Application No. 19870772.1.
Piotr KUJAWA et al., "Do Fluorocarbon, Hydrocarbon, and Polycyclic Aromatic Groups Intermingle? A Study of the Interactions in Water between Fluorocarbon- and Hydrocarbon-Modified Poly(N-isopropylacrylamides)", Journal of Physical Chemistry Part B, Apr. 2002, vol. 106, No. 21, pp. 5578-5585 (8 pages).
International Search Report of PCT/JP2019/039857 dated Dec. 24, 2019 [PCT/ISA/210].

* cited by examiner

*Primary Examiner* — Catherine S Branch
(74) *Attorney, Agent, or Firm* — Sughrue Mion, PLLC

(57) ABSTRACT

A fluorine-containing polymer including a repeat unit derived from a fluorine-containing monomer (A1) and a repeat unit derived from a hydrocarbon group-bearing fluorine-free monomer (A2). The fluorine-free monomer (A2) is preferably at least one monomer selected from (A2-1) $R^{22}$—C(=O)—NH—$R^{23}$—O—$R^{21}$, (A2-2) $CH_2$=C(—$R^{32}$)—C(=O)—$Y^{31}$—$Z^{31}$(—$Y^{32}$—$R^{31}$)$_n$, and (A2-3) $X^{41}$N(H)$_r$—$R^{41}$. Also disclosed is a surface treatment agent containing (A) the fluorine-containing polymer and (B) a liquid medium, as well as a method for producing the surface treatment agent and a method for producing a treated substrate.

14 Claims, No Drawings

FLUORINE-CONTAINING POLYMER AND SURFACE TREATMENT AGENT

CROSS-REFERENCE TO RELATED APPLICATIONS

This application is a Rule 53(b) Continuation of International Application No. PCT/JP2019/039857 filed Oct. 9, 2019, which claims priority based on Japanese Patent Application No. 2018-191632 filed Oct. 10, 2018. The disclosures of the above-identified applications are incorporated herein by reference in their entirety.

TECHNICAL FIELD

The present disclosure relates to a fluorine-containing polymer and a surface treatment agent comprising the fluorine-containing polymer. Specifically, the present disclosure relates to the fluorine-containing polymer and the surface treatment agent which can impart excellent water repellency, oil repellency, antifouling property, releasability, and/or mold releasability to a substrate.

BACKGROUND ART

Conventionally, a fluorine-containing surface treatment agent comprising a fluorine compound has been known. The fluorine-containing surface treatment agent exhibits favorable water- and oil-repellency when the surface treatment agent is treated on a substrate such as textile products.

The fluorine-containing compound imparting water- and oil-repellency to the textile products includes a fluorine-containing polymer having a fluoroalkyl group.

Patent Literature 1 (JP 2011-516617 A) (Japanese Patent No. 5546459) discloses a dispersion of a fluorosilicone reaction product comprising a mercapto-functional, vinyl-functional or (meth)acrylamide-functional organopolysiloxane and a fluorine-containing monomer.

Patent Literature 2 (JP 2015-166465 A) (Japanese Patent No. 5971375) discloses an aqueous emulsion-treatment agent comprising a polymer having a repeating unit derived from a long-chain (meth)acrylate ester monomer and a repeating unit derived from a (meth)acrylate monomer having a cyclic hydrocarbon group.

CITATION LIST

Patent Literature

Patent Literature 1
JP 2011-516617 A
Patent Literature 2
JP 2015-166465 A

Non Patent Literature

Non Paten Literature 1
Koji Honda et al., Macromolecules, 38, 5699-5705 (2005)

SUMMARY OF INVENTION

Technical Problem

An object of the present disclosure is to provide a surface treatment agent (particularly a water repellent agent) which imparts excellent water- and oil-repellency, particularly water repellency, to a substrate such as fibers.

Solution to Problem

The present disclosure provides a fluorine-containing polymer having a first side chain having a fluoroalkyl group having 1 to 20 carbon atoms, and a second side chain having a monovalent hydrocarbon group having 7 to 40 carbon atoms. The second side chain preferably has a divalent —NH— group or a trivalent —N= group between the monovalent hydrocarbon group and a backbone chain. Further, the backbone chain is preferably a backbone chain derived from an ethylenically unsaturated polymerizable group, particularly an acrylic group.

The present disclosure provides a fluorine-containing polymer, comprising (A1) a repeating unit derived from a fluorine-containing monomer and (A2) a repeating unit derived from a fluorine-free monomer having a hydrocarbon group. The fluorine-containing monomer (A1) is preferably an ethylenically unsaturated monomer having a fluoroalkyl group having 1 to 20 carbon atoms. The fluorine-free monomer (A2) is preferably an ethylenically unsaturated monomer having a monovalent hydrocarbon group having 7 to 40 carbon atoms and a divalent —NH— group or a trivalent —N= group.

The present disclosure provides a surface treatment agent comprising (A) a fluorine-containing polymer having (A1) a repeating unit derived from the fluorine-containing monomer and (A2) a repeating unit derived from the fluorine-free monomer having a hydrocarbon group, and (B) a liquid medium.

In addition, the present disclosure also provides a method for producing a surface treatment agent, comprising polymerizing monomers (a monomer mixture) comprising the fluorine-containing monomer (A1) and the fluorine-free monomer having a hydrocarbon group (A2) in the presence of the liquid medium to obtain a dispersion or solution of (A) the fluorine-containing polymer having (A1) a repeating unit derived from the fluorine-containing monomer and (A2) a repeating unit derived from the fluorine-free monomer having the hydrocarbon group.

Further additionally, the present disclosure provides a method for producing a treated substrate, comprising applying the surface treatment agent to a substrate.

The preferred embodiments of the present disclosure are as follows:

[1]
A fluorine-containing polymer, comprising:
a first side chain having a fluoroalkyl group having 1 to 20 carbon atoms, and
a second side chain having a monovalent hydrocarbon group having 7 to 40 carbon atoms, wherein
the second side chain has a divalent —NH— group or a trivalent —N= group between the monovalent hydrocarbon group and a backbone chain, and
the backbone chain is a backbone chain derived from an ethylenically unsaturated polymerizable group.

[2]
A fluorine-containing polymer, comprising:
(A1) a repeating unit derived from a fluorine-containing monomer which is an ethylenically unsaturated monomer having a fluoroalkyl group having 1 to 20 carbon atoms, and (A2) a repeating unit derived from a fluorine-free monomer which is an ethylenically unsaturated monomer 11having a monovalent hydrocarbon group having 7 to 40 carbon atoms and a divalent —NH— group or a trivalent —N= group.

[3]

A fluorine-containing polymer (A), comprising a repeating unit derived from a fluorine-containing monomer (A1), and a repeating unit derived from a fluorine-free monomer having a hydrocarbon group (A2), wherein
the fluorine-containing monomer (A1) is a compound represented by formula:

$$CH_2=C(-X^{11})-C(=O)-Y^{11}-Z^{11}-Rf$$

wherein $X^{11}$ is a hydrogen atom, a monovalent organic group or a halogen atom,
$Y^{11}$ is —O— or —NH—,
$Z^{11}$ is a direct bond or a divalent organic group, and
Rf is a fluoroalkyl group having 1 to 20 carbon atoms, and
the fluorine-free monomer having a hydrocarbon group (A2) is at least one monomer selected from the group consisting of
(A2-1) an amide group-containing monomer represented by formula:

$$R^{22}-C(=O)-NH-R^{23}-O-R^{21}$$

wherein $R^{21}$ is an organic residue having an ethylenically unsaturated polymerizable group,
$R^{22}$ is a hydrocarbon group having 7 to 40 carbon atoms, and
$R^{23}$ is a hydrocarbon group having 1 to 5 carbon atoms,
(A2-2) a nitrogen-containing monomer represented by formula:

$$CH_2=C(-R^{32})-C(=O)-Y^{31}-Z^{31}(-Y^{32}-R^{31})_n$$

wherein $R^{31}$ is a hydrocarbon group having 7 to 40 carbon atoms,
$R^{32}$ is a hydrogen atom, a methyl group, or a halogen atom other than a fluorine atom,
$Y^{31}$ is —O— or —NH—,
$Y^{32}$ is —O—C(=O)—NH— or —NH—C(=O)—O— or —NH—C(=O)—NH—,
$Z^{31}$ is a divalent or trivalent hydrocarbon group having 1 to 5 carbon atoms, and
n is 1 or 2, and
(A2-3) an acrylamide monomer represented by formula:

$$X^{41}N(H)_r-R^{41}$$

wherein $R^{41}$ is a hydrocarbon group having 7 to 40 carbon atoms,
$X^{41}$ is a monovalent group which is $CH_2=C(-R^{42})-C(=O)-$ wherein $R^{42}$ is a hydrogen atom or a methyl group, or a divalent group which is —C(=O)—CH=CH—C(=O)—, and r is 0 when $X^{41}$ is divalent, or is 1 when $X^{41}$ is monovalent.

[4]

The fluorine-containing polymer according to [3], wherein, in the fluorine-containing monomer (A1), $X^{11}$ is a hydrogen atom, a methyl group or a chlorine atom, $Y^{11}$ is —O—, $Z^{11}$ is a direct bond or an alkylene group having 1 to 20 carbon atoms, and Rf is a perfluoroalkyl group having 1 to 8 carbon atoms.

[5]

The fluorine-containing polymer according to any one of [2] to [4], wherein
the fluorine-containing monomer (A1) is at least one compound selected from the group consisting of $$CH_2=C(-H)-C(=O)-O-(CH_2)_2-C_6F_{13}$$

$$CH_2=C(-CH_3)-C(=O)-O-(CH_2)_2-C_6F_{13},$$
and $$CH_2=C(-Cl)-C(=O)-O-(CH_2)_2-C_6F_{13},$$

the fluorine-free monomer (A2-1) is at least one compound selected from the group consisting of palmitic acid amidoethyl (meth)acrylate and stearic acid amidoethyl (meth)acrylate,
the fluorine-free monomer (A2-2) is at least one compound selected from the group consisting of

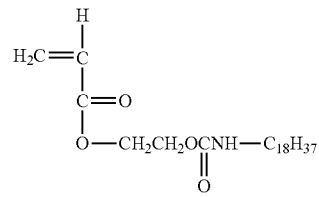

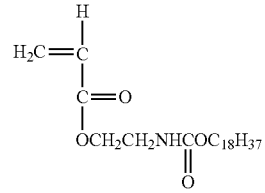

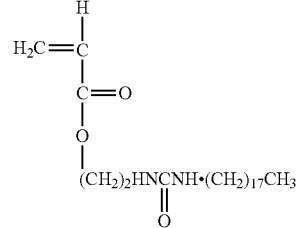

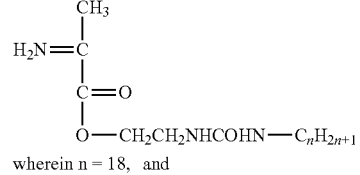

wherein n = 18, and

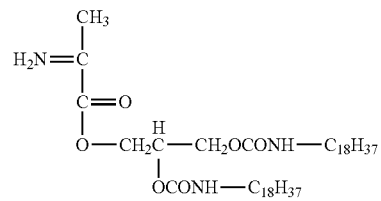

the fluorine-free monomer (A2-3) is at least one compound selected from the group consisting of lauryl (meth)acrylamide, cetyl (meth)acrylamide, stearyl (meth)acrylamide, behenyl (meth)acrylamide, N-lauryl maleimide, N-cetyl maleimide, N-stearyl maleimide and N-behenyl maleimide.

[6]
The fluorine-containing polymer according to any one of [2] to [5], wherein the fluorine-containing polymer further has a repeating unit derived from a further monomer (A3) other than the monomers (A1) and (A2), and
the further monomer (A3) is at least one selected from the group consisting of
(A3-1) a repeating unit derived from a fluorine-free non-crosslinkable monomer, and
(A3-2) a repeating unit derived from a fluorine-free crosslinkable monomer.

[7]
The fluorine-containing polymer according to [6], wherein the fluorine-free non-crosslinkable monomer (A3-1) is a compound represented by formula:

$$CH_2=CA-T$$

wherein A is a hydrogen atom, a methyl group, or a halogen atom other than a fluorine atom, such as a chlorine atom, a bromine atom, and an iodine atom, T is a hydrogen atom, a chain or cyclic hydrocarbon group having 1 to 40 carbon atoms, or a chain or cyclic organic group having 1 to 41 carbon atoms and having an ester bond.

[8]
The fluorine-containing polymer according to [6], wherein the fluorine-free non-crosslinkable monomer (A3-1) is at least one compound selected from the group consisting of stearyl (meth)acrylate and behenyl (meth)acrylate, and/or at least one compound selected from the group consisting of vinyl chloride, vinyl bromide, vinyl iodide, vinylidene chloride, vinylidene bromide and vinylidene iodide, and
the fluorine-free crosslinkable monomer (A3-2) is at least one compound selected from the group consisting of diacetone acrylamide, (meth)acrylamide, N-methylol acrylamide, hydroxymethyl (meth)acrylate, hydroxyethyl (meth)acrylate, 3-chloro-2-hydroxypropyl (meth)acrylate, 2-acetoacetoxyethyl (meth)acrylate, N,N-dimethylaminoethyl (meth)acrylate, N,N-diethylaminoethyl (meth)acrylate, butadiene, isoprene, chloroprene and glycidyl (meth)acrylate.

[9]
The fluorine-containing polymer according to any one of [3] to [8], wherein an amount of the fluorine-containing monomer (A1) is 0.1 to 95% by weight, an amount of the fluorine-free monomer (A2) is 0.1 to 95% by weight, and an amount of the further monomer (A3) is 0 to 80% by weight, based on the fluorine-containing polymer.

[10]
A surface treatment agent comprising:
(A) the fluorine-containing polymer according to any one of [1] to [9], and
(B) a liquid medium.

[11]
The surface treatment agent according to [10], wherein the liquid medium (B) is an organic solvent, or water, or an organic solvent or a mixture of water and an organic solvent.

[12]
The surface treatment agent according to [10] or [11], wherein
the surface treatment agent is an aqueous dispersion in which the polymer is dispersed in water or a mixture of water and an organic solvent, and
the surface treatment agent comprises
(C) a surfactant comprising a nonionic surfactant.

[13]
The surface treatment agent according to any one of [10] to [12], wherein the surface treatment agent is a water repellent agent, an oil repellent agent, a soil resistant agent, a soil release agent, a peel agent, or a mold release agent.

[14]
A method for producing the surface treatment agent according to any one of [10] to [13], comprising: polymerizing a monomer mixture comprising the fluorine-containing monomer (A1) and the fluorine-free monomer having a hydrocarbon group (A2) in the presence of the liquid medium to obtain a dispersion or a solution of the fluorine-containing polymer (A).

[15]
A method for producing a treated substrate, comprising applying the surface treatment agent according to any one of [10] to [13] to a substrate.

Advantageous Effects of Invention

The surface treatment agent of the present disclosure does not bring about particle precipitation, whereby a polymer does not adhere to a roll to cause fabric stains.

According to the present disclosure, excellent water repellency, oil repellency, antifouling property, and soil releasability, particularly the excellent water repellency, are obtained. The water repellency, the oil repellency, the antifouling property, and the soil releasability are excellent in durability.

The surface treatment agent of the present disclosure imparts excellent slip resistance (excellent slippage resistance) to a substrate.

The surface treatment agent of the present disclosure can be used as a water- and oil-repellent agent, a soil resistant agent, a soil release agent, a peel agent, or a mold release agent.

DESCRIPTION OF EMBODIMENTS

The surface treatment agent is generally an aqueous emulsion or an organic solvent solution, comprising a fluorine-containing polymer.

The surface treatment agent comprises:
(A) a fluorine-containing polymer having a repeating unit derived from a fluorine-containing monomer having a fluoroalkyl group (A1) and a repeating unit derived from a fluorine-free monomer having a hydrocarbon group (A2), and
(B) a liquid medium.

(A) Fluorine-Containing Polymer

The fluorine-containing polymer is a copolymer having a repeating unit derived from the fluorine-containing monomer having a fluoroalkyl group and a repeating unit derived from the fluorine-free monomer having a hydrocarbon group. The fluorine-containing polymer may have a repeating unit derived from other polymerizable compound which is copolymerizable with the fluorine-containing monomer or fluorine-free monomer.

The fluorine-containing polymer may be a random polymer or a block polymer.

The fluorine-containing polymer is preferably formed of an acrylic monomer, particularly acrylate or acrylamide. Namely, the fluorine-containing monomer and the fluorine-free monomer (and the further monomer) are preferably acrylic monomers, particularly acrylates or acrylamides.

In the present disclosure, the fluorine-containing polymer (A) may, for example, consist of (A1) a repeating unit derived from the fluorine-containing monomer having a fluoroalkyl group and (A2) a repeating unit derived from the fluorine-free monomer having a hydrocarbon group.

Alternatively, the fluorine-containing polymer (A) may have, for example, one or both of (A3-1) a repeating unit derived from a fluorine-free non-crosslinkable monomer and (A3-2) a repeating unit derived from a fluorine-free crosslinkable monomer, in addition to the repeating units (A1) and (A2).

(A1) Fluorine-Containing Monomer

The fluorine-containing monomer (A1) is generally a polymerizable compound having a perfluoroalkyl group or a perfluoroalkenyl group and an acrylic acid group or a methacrylic acid group or an α-substituted acrylic acid group.

The fluorine-containing monomer (A1) is preferably a compound (acrylate ester or acrylamide) represented by the formula:

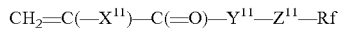

$CH_2=C(-X^{11})-C(=O)-Y^{11}-Z^{11}-Rf$ wherein $X^{11}$ is a hydrogen atom, a monovalent organic group or a halogen atom,
$Y^{11}$ is —O— or —NH—,
$Z^{11}$ is a direct bond or a divalent organic group, and
Rf is a fluoroalkyl group having 1 to 20 carbon atoms.

$X^{11}$ may be, for example, a hydrogen atom, a linear or branched alkyl group having 1 to 21 carbon atoms, a fluorine atom, a chlorine atom, a bromine atom, an iodine atom, and a $CFX^1X^2$ group wherein $X^1$ and $X^2$ are hydrogen atoms, fluorine atoms, chlorine atoms, bromine atoms or iodine atoms, a cyano group, a linear or branched fluoroalkyl group having 1 to 21 carbon atoms, a substituted or unsubstituted benzyl group, and a substituted or unsubstituted phenyl group. Specific examples of $X^{11}$ are H, $CH_3$, Cl, Br, I, F, CN and $CF_3$. The $X^{11}$ is preferably a methyl group or a chlorine atom and particularly preferably a chlorine atom.

$Z^{11}$ may be, for example, a direct bond, a linear or branched aliphatic group having 1 to 20 carbon atoms (particularly an alkylene group), for example, a group represented by the formula: —$(CH_2)_x$— wherein x is 1 to 10, or a group represented by the formula: —$R^2(R^1)N-SO_2$— or the formula: —$R^2(R^1)N-CO$—, wherein $R^1$ is an alkyl group having 1 to 10 carbon atoms and $R^2$ is a linear alkylene group or a branched alkylene group, having 1 to 10 carbon atoms, or a group represented by the formula: —$CH_2CH(OR^3)CH_2-(Ar-O)_p$—, wherein $R^3$ is a hydrogen atom or an acyl group having 1 to 10 carbon atoms (for example, formyl or acetyl), Ar is an arylene group having a substituent if necessary, and p represents 0 or 1, or a group represented by the formula: —$CH_2-Ar-(O)_q$—, wherein Ar is an arylene group having a substituent if necessary, and q is 0 or 1, a —$(CH_2)_mSO_2-(CH_2)_n$— group, or a —$(CH_2)_m-S-(CH_2)_n$— group wherein m is 1 to 10 and n is 0 to 10.

The $Z_{11}$ is preferably a direct bond, an aliphatic group having 1 to 10 carbon atoms, an aromatic group or a cyclic aliphatic group having 6 to 18 carbon atoms, a —$CH_2CH_2N(R^1)SO_2$— group wherein $R^1$ is an alkyl group having 1 to 4 carbon atoms, a —$CH_2CH(OZ^1)CH_2-(Ph-O)_p$— group wherein $Z^1$ is a hydrogen atom or an acetyl group, Ph is a phenylene group, and p is 0 or 1, a —$(CH_2)_n$-Ph-O— group wherein Ph is a phenylene group and n is 0 to 10), a —$(CH_2)_mSO_2-(CH_2)_n$— group or a —$(CH_2)_m-S-(CH_2)_n$— group wherein m is 1 to 10 and n is 0 to 10. The aliphatic group is preferably an alkylene group (particularly the number of carbon atoms is 1 to 4, for example, 1 or 2). The aromatic or cyclic aliphatic group may be substituted or unsubstituted. The S group or $SO_2$ group may be directly bonded to the Rf group.

The Rf group may be linear or branched, and is preferably a perfluoroalkyl group. The number of carbon atoms of the Rf group is preferably 1 to 12, for example, 1 to 8, particularly 4 to 6, and specially preferably 6. Examples of the Rf group include —$CF_3$, —$CF_2CF_3$, —$CF_2CF_2CF_3$, —$CF(CF_3)_2$, —$CF_2CF_2CF_2CF_3$, —$CF_2CF(CF_3)_2$, —$C(CF_3)_3$, —$(CF_2)_4CF_3$, —$(CF_2)_2CF(CF_3)_2$, —$CF_2C(CF_3)_3$, —$CF(CF_3)CF_2CF_2CF_3$, —$(CF_2)_5CF_3$, —$(CF_2)_3CF(CF_3)_2$, —$(CF_2)_4CF(CF_3)_2$, and —$CeF_{17}$.

Specific examples of the fluorine-containing monomer (A1) include the following, but are not limited thereto:
$CH_2=C(-H)-C(=O)-O-(CH_2)_2-Rf$
$CH_2=C(-H)-C(=O)-O-C_6H_4-Rf$
$CH_2=C(-Cl)-C(=O)-O-(CH_2)_2-Rf$
$CH_2=C(-H)-C(=O)-O-(CH_2)_2N(-CH_3) SO_2-Rf$
$CH_2=C(-H)-C(=O)-O-(CH_2)_2N(-C_2H_5) SO_2-Rf$
$CH_2=C(-H)-C(=O)-O-CH_2CH(-OH) CH_2-Rf$
$CH_2=C(-H)-C(=O)-O-CH_2CH(-OCOCH_3) CH_2-Rf$
$CH_2=C(-H)-C(=O)-O-(CH_2)_2-S-Rf$
$CH_2=C(-H)-C(=O)-O-(CH_2)_2-S-(CH_2)_2-Rf$
$CH_2=C(-H)-C(=O)-O-(CH_2)_3-SO_2-Rf$
$CH_2=C(-H)-C(=O)-O-(CH_2)_2-SO_2-(CH_2)_2-Rf$
$CH_2=C(-H)-C(=O)-NH-(CH_2)_2-Rf$
$CH_2=C(-CH_3)-C(=O)-O-(CH_2)_2-S-Rf$
$CH_2=C(-CH_3)-C(=O)-O-(CH_2)_2-S-(CH_2)_2-Rf$
$CH_2=C(-CH_3)-C(=O)-O-(CH_2)_3-SO_2-Rf$
$CH_2=C(-CH_3)-C(=O)-O-(CH_2)_2-SO_2-(CH_2)_2-Rf$
$CH_2=C(-CH_3)-C(=O)-NH-(CH_2)_2-Rf$
$CH_2=C(-F)-C(=O)-O-(CH_2)_2-S-Rf$
$CH_2=C(-F)-C(=O)-O-(CH_2)_2-S-(CH_2)_2-Rf$
$CH_2=C(-F)-C(=O)-O-(CH_2)_2-SO_2-Rf$
$CH_2=C(-F)-C(=O)-O-(CH_2)_2-SO_2-(CH_2)_2-Rf$
$CH_2=C(-F)-C(=O)-NH-(CH_2)_2-Rf$
$CH_2=C(-Cl)-C(=O)-O-(CH_2)_2-S-Rf$
$CH_2=C(-Cl)-C(=O)-O-(CH_2)_2-S-(CH_2)_2-Rf$
$CH_2=C(-Cl)-C(=O)-O-(CH_2)_2-SO_2-Rf$
$CH_2=C(-Cl)-C(=O)-O-(CH_2)_2-SO_2-(CH_2)_2-Rf$
$CH_2=C(-Cl)-C(=O)-NH-(CH_2)_2-Rf$
$CH_2=C(-CF_3)-C(=O)-O-(CH_2)_2-S-Rf$
$CH_2=C(-CF_3)-C(=O)-O-(CH_2)_2-S-(CH_2)_2-Rf$
$CH_2=C(-CF_3)-C(=O)-O-(CH_2)_2-SO_2-Rf$
$CH_2=C(-CF_3)-C(=O)-O-(CH_2)_2-SO_2-(CH_2)_2-Rf$
$CH_2=C(-CF_3)-C(=O)-NH-(CH_2)_2-Rf$
$CH_2=C(-CF_2H)-C(=O)-O-(CH_2)_2-S-Rf$
$CH_2=C(-CF_2H)-C(=O)-O-(CH_2)_2-S-(CH_2)_2-Rf$
$CH_2=C(-CF_2H)-C(=O)-O-(CH_2)_2-SO_2-Rf$
$CH_2=C(-CF_2H)-C(=O)-O-(CH_2)_2-SO_2-(CH_2)_2-Rf$
$CH_2=C(-CF_2H)-C(=O)-NH-(CH_2)_2-Rf$
$CH_2=C(-CN)-C(=O)-O-(CH_2)_2-S-Rf$
$CH_2=C(-CN)-C(=O)-O-(CH_2)_2-S-(CH_2)_2-Rf$
$CH_2=C(-CN)-C(=O)-O-(CH_2)_2-SO_2-Rf$
$CH_2=C(-CN)-C(=O)-O-(CH_2)_2-SO_2-(CH_2)_2-Rf$
$CH_2=C(-CN)-C(=O)-NH-(CH_2)_2-Rf$
$CH_2=C(-CF_2CF_3)-C(=O)-O-(CH_2)_2-S-Rf$
$CH_2=C(-CF_2CF_3)-C(=O)-O-(CH_2)_2-S-(CH_2)_2-Rf$
$CH_2=C(-CF_2CF_3)-C(=O)-O-(CH_2)_2-SO_2-Rf$ $CH_2=C(-CF_2CF_3)-C(=O)-O-(CH_2)_2-SO_2-(CH_2)_2-Rf$
$CH_2=C(-CF_2CF_3)-C(=O)-NH-(CH_2)_2-Rf$
$CH_2=C(-F)-C(=O)-O-(CH_2)_3-S-Rf$
$CH_2=C(-F)-C(=O)-O-(CH_2)_3-S-(CH_2)_2-Rf$
$CH_2=C(-F)-C(=O)-O-(CH_2)_3-SO_2-Rf$
$CH_2=C(-F)-C(=O)-O-(CH_2)_3-SO_2-(CH_2)_2-Rf$
$CH_2=C(-F)-C(=O)-NH-(CH_2)_3-Rf$
$CH_2=C(-Cl)-C(=O)-O-(CH_2)_3-S-Rf$
$CH_2=C(-Cl)-C(=O)-O-(CH_2)_3-S-(CH_2)_2-Rf$
$CH_2=C(-Cl)-C(=O)-O-(CH_2)_3-SO_2-Rf$
$CH_2=C(-Cl)-C(=O)-O-(CH_2)_3-SO_2-(CH_2)_2-Rf$
$CH_2=C(-CF_3)-C(=O)-O-(CH_2)_3-S-Rf$
$CH_2=C(-CF_3)-C(=O)-O-(CH_2)_3-S-(CH_2)_2-Rf$
$CH_2=C(-CF_3)-C(=O)-O-(CH_2)_3-SO_2-Rf$
$CH_2=C(-CF_3)-C(=O)-O-(CH_2)_3-SO_2-(CH_2)_2-Rf$
$CH_2=C(-CF_2H)-C(=O)-O-(CH_2)_3-S-Rf$
$CH_2=C(-CF_2H)-C(=O)-O-(CH_2)_3-S-(CH_2)_2-Rf$
$CH_2=C(-CF_2H)-C(=O)-O-(CH_2)_3-SO_2-Rf$
$CH_2=C(-CF_2H)-C(=O)-O-(CH_2)_3-SO_2-(CH_2)_2-Rf$
$CH_2=C(-CN)-C(=O)-O-(CH_2)_3-S-Rf$
$CH_2=C(-CN)-C(=O)-O-(CH_2)_3-S-(CH_2)_2-Rf$
$CH_2=C(-CN)-C(=O)-O-(CH_2)_3-SO_2-Rf$
$CH_2=C(-CN)-C(=O)-O-(CH_2)_3-SO_2-(CH_2)_2-Rf$
$CH_2=C(-CF_2CF_3)-C(=O)-O-(CH_2)_3-S-Rf$
$CH_2=C(-CF_2CF_3)-C(=O)-O-(CH_2)_3-S-(CH_2)_2-Rf$
$CH_2=C(-CF_2CF_3)-C(=O)-O-(CH_2)_3-SO_2-Rf$
$CH_2=C(-CF_2CF_3)-C(=O)-O-(CH_2)_2-SO_2-(CH_2)_2-Rf$ wherein Rf is a fluoroalkyl group having 1 to 20 carbon atoms.

(A2) Fluorine-Free Monomer

The fluorine-free monomer (A2) is a fluorine-free monomer having a hydrocarbon group. The fluorine-free monomer (A2) does not comprise a fluorine atom.

The hydrocarbon group (having 1 to 40, for example, 4 to 30 carbon atoms) is a saturated or unsaturated group. The hydrocarbon group is preferably a saturated hydrocarbon group and particularly preferably an alkyl group.

The hydrocarbon group is preferably a long-chain hydrocarbon group. The long-chain hydrocarbon group preferably has 7 to 40 carbon atoms. The long-chain hydrocarbon group is preferably a linear or branched hydrocarbon group having 7 to 40 carbon atoms. The long-chain hydrocarbon group preferably has 10 to 40 carbon atoms, for example, 12 to 30 carbon atoms, particularly 16 to 26 carbon atoms. The long-chain hydrocarbon group is particularly preferably a stearyl group, an icosyl group or a behenyl group.

The fluorine-free monomer (A2) is generally an ethylenically unsaturated monomer having an —NH— group or a trivalent —N= group (particularly an imide group) (for example, an acrylate monomer, an acrylamide monomer, or an acrylimide monomer).

The fluorine-free monomer (A2) is, for example, (A2-1) an amide group-containing monomer represented by formula:

$$R^{22}-C(=O)-NH-R^{23}-O-R^{21}$$

wherein $R^{21}$ is an organic residue having an ethylenically unsaturated polymerizable group, $R^{22}$ is a hydrocarbon group having 7 to 40 carbon atoms, and
$R^{23}$ is a hydrocarbon group having 1 to 5 carbon atoms, (A2-2) a nitrogen-containing monomer represented by formula:

$$CH_2=C(-R^{32})-C(=O)-Y^{31}-Z^{31}(-Y^{32}-R^{31})_n$$

wherein $R^{31}$ is a hydrocarbon group having 7 to 40 carbon atoms, $R^{32}$ is a hydrogen atom, a methyl group, or a halogen atom other than a fluorine atom, $Y^{31}$ is —O— or —NH—, $Y^{32}$ is —OC(=O)—NH— or —NH—C(=O)—NH—, $Z^{31}$ is a divalent or trivalent hydrocarbon group having 1 to 5 carbon atoms, and n is 1 or 2, and (A2-3) an acrylamide monomer represented by formula:

$$X^{41}N(H)_r-R^{41}$$

wherein $R^{41}$ is a hydrocarbon group having 7 to 40 carbon atoms, $X^{41}$ is a monovalent group which is $CH_2=C(-R^{42})-C(=O)-$ wherein $R^{42}$ is a hydrogen atom or a methyl group, or a divalent group which is —C(=O)—CH=CH—C(=O)—, and r is 0 when $X^{41}$ is divalent, or is 1 when $X^{41}$ is monovalent.

(A2-1) Amide Group-Containing Monomer

The amide group-containing monomer (A2-1) may be a compound represented by the formula:

$$R^{22}-C(=O)-NH-R^{23}-O-R^{21}$$

wherein $R^{21}$ is an organic residue having an ethylenically unsaturated polymerizable group, $R^{22}$ is a hydrocarbon group having 7 to 40 carbon atoms, and $R^{23}$ is a hydrocarbon group having 1 to 5 carbon atoms.

$R^{21}$ is an organic residue having an ethylenically unsaturated polymerizable group, and is not limited provided that it has a double bond between carbons. Specific examples thereof include organic residues having ethylenically unsaturated polymerizable groups, such as —C(=O)CR$^{24}$=CH$_2$, —CHR$^{24}$=CH$_2$, and —CH$_2$CHR$^{24}$=CH$_2$, and specific examples of $R^{24}$ include a hydrogen atom or an alkyl group having 1 to 4 carbon atoms. Moreover, for example, $R^{21}$ may have various organic groups in addition to the ethylenically unsaturated polymerizable group, and includes, for example, organic groups, such as a chain hydrocarbon, a cyclic hydrocarbon, a polyoxyalkylene group, a polysiloxane group, and for example, these organic groups may be substituted with various substituents.

$R^{22}$ is a hydrocarbon group having 7 to 40 carbon atoms, preferably an alkyl group, and includes a chain hydrocarbon, and a cyclic hydrocarbon. Among these, the chain hydrocarbon is preferred, and a linear saturated hydrocarbon group is particularly preferred. The number of carbon atoms of $R^{21}$ is 7 to 40, preferably 11 to 27, and particularly preferably 15 to 23.

$R^{23}$ is a hydrocarbon group having 1 to 5 carbon atoms. The hydrocarbon group having 1 to 5 carbon atoms may be in the form of a linear chain or a branched chain, and may have an unsaturated bond, and is preferably in the form of the linear chain. The number of carbon atoms of $R^{23}$ is preferably 2 to 4, and particularly preferably 2. $R^{23}$ is preferably an alkylene group.

The amide group-containing monomer (A2-1) may be such that $R^{21}$ is a single type (for example, a compound alone wherein $R^{21}$ has 17 carbon atoms) or $R^{21}$ is a combination of multiple types (for example, a mixture of a compound wherein $R^{21}$ has 17 carbon atoms and a compound wherein $R^{21}$ has 15 carbon atoms).

The amide group-containing monomer (A2-1) is, for example, carboxylic acid amidoalkyl (meth)acrylate.

The amide group-containing monomer (A2-1) may be, for example, a compound represented by the formula:

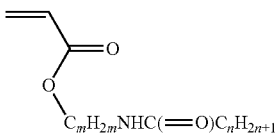

wherein n is a numeral of 7 to 40 and m is a numeral of 1 to 5.

Specific examples of the amide group-containing monomer (A2-1) include palmitic acid amidoethyl (meth)acrylate, stearic acid amidoethyl (meth)acrylate, behenic acid amidoethyl (meth)acrylate, myristic acid amidoethyl (meth)acrylate, lauric acid amidoethyl (meth)acrylate, isostearic acid amidoethyl (meth)acrylate, oleic acid amidoethyl (meth)acrylate, tertiary butylcyclohexylcaproic acid amidoethyl (meth)acrylate, adamantancarboxylic acid amidoethyl (meth)acrylate, naphthalenecarboxylic acid amidoethyl (meth)acrylate, anthracenecarboxylic acid amidoethyl (meth)acrylate, palmitic acid amidopropyl (meth)acrylate, stearic acid amidopropyl (meth)acrylate, palmitic acid amidoethyl vinyl ether, stearic acid amidoethyl vinyl ether, palmitic acid amidoethyl allyl ether, stearic acid amidoethyl allyl ether, or mixtures thereof.

The amide group-containing monomer (A2-1) is preferably stearic acid amidoethyl (meth)acrylate. The amide group-containing monomer (A2-1) may be a mixture comprising stearic acid amidoethyl (meth)acrylate. In the mixture comprising stearic acid amidoethyl (meth)acrylate, the amount of stearic acid amidoethyl (meth)acrylate may be, for example, 55 to 99% by weight, preferably 60 to 95% by weight, more preferably 70 to 90% by weight, based on the total weight of the amide group-containing monomer, and the remaining monomer may be, for example, palmitic acid amidoethyl (meth)acrylate.

(A2-2) Nitrogen-Containing Monomer

The nitrogen-containing monomer (A2-2) is (meth)acrylate or (meth)acrylamide having a urethane group or a urea group.

The nitrogen-containing monomer (A2-2) may be a compound represented by the formula:

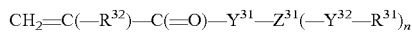

wherein $R^{31}$ is a hydrocarbon group having 7 to 40 carbon atoms,
  $R^{32}$ is a hydrogen atom, a methyl group, or a halogen atom other than a fluorine atom,
  $Y^{31}$ is —O— or —NH—,
  $Y^{32}$ is —O—C(=O)—NH— or —NH—C(=O)—O— or —NH—C(=O)—NH—,
  $Z^{31}$ is a divalent or trivalent hydrocarbon group having 1 to 5 carbon atoms, and
  n is 1 or 2.
  $R^{31}$ is preferably a linear or branched hydrocarbon group. $R^{31}$ is preferably an alkyl group. The number of carbon atoms of $R^{31}$ is preferably 12 to 40, particularly 16 to 24 or 18 to 24.
  $R^{32}$ is preferably a hydrogen atom or a methyl group and particularly preferably a hydrogen atom.

$Z^{31}$ may be a divalent or trivalent alkane group, for example, an alkylene group (a divalent alkylene group). The number of carbon atoms of $Z^{31}$ is preferably 2 to 4, particularly 2. Specific examples of $Z^{31}$ include —CH$_2$—, —CH$_2$CH$_2$—, —CH$_2$CH$_2$CH$_2$—, —CH$_2$CH$_2$CH$_2$CH$_2$—, —CH$_2$CH$_2$CH$_2$CH$_2$CH$_2$— as divalent alkane groups, and —CH$_2$CH=, —CH$_2$(CH—)CH$_2$— and —CH$_2$CH$_2$(CH—)CH$_2$— as trivalent alkane groups.

The nitrogen-containing monomer (A2-2) can be produced by reacting hydroxyalkyl (meth)acrylate or hydroxyalkyl (meth)acrylamide with a long-chain alkyl isocyanate. The long-chain alkyl isocyanate includes, for example, lauryl isocyanate, myristyl isocyanate, cetyl isocyanate, stearyl isocyanate, oleyl isocyanate, and behenyl isocyanate.

Alternatively, the nitrogen-containing monomer (A2-2) can also be produced by reacting (meth)acrylate having an isocyanate group in the side chain, for example, 2-methacryloyloxyethyl isocyanate, with a long-chain alkylamine or a long-chain alkylalcohol. Example of the long-chain alkylamine includes laurylamine, myristylamine, cetylamine, stearylamine, oleylamine, and behenylamine. Example of the long-chain alkyl alcohol includes lauryl alcohol, myristyl alcohol, cetyl alcohol, stearyl alcohol, oleyl alcohol, and behenyl alcohol.

Specific examples of the nitrogen-containing monomer (A2-2) are as follows:

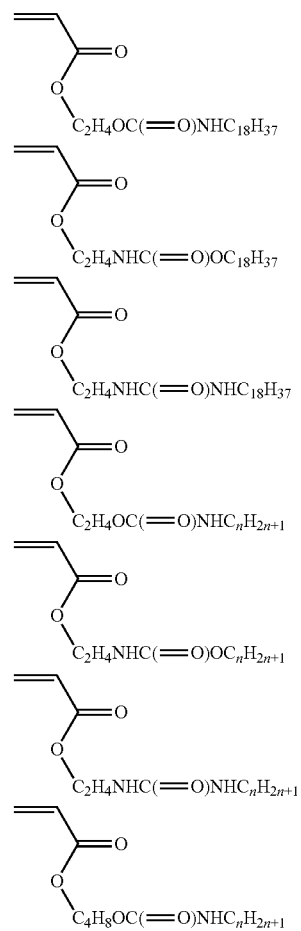

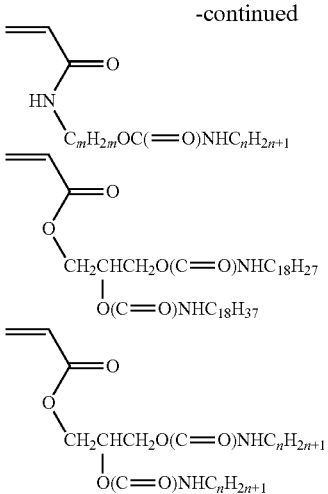

wherein n is a numeral of 7 to 40 and m is a numeral of 1 to 5.

The compounds having the above chemical formulae are each an acrylic compound in which the α-position is a hydrogen atom, but these may be each, for example, a methacrylic compound in which the α-position is a methyl group and an α-chloroacrylic compound in which the α-position is a chlorine atom.

The nitrogen-containing monomer (A2-2) preferably has the following structure:

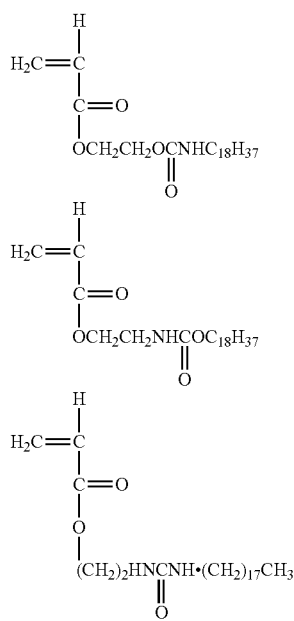

(A2-3) Acrylamide Monomer

The acrylamide monomer (A2-3) may be, for example, a compound represented by the formula:

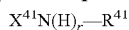

$X^{41}N(H)_r$—$R^{41}$ wherein $R^{41}$ is a hydrocarbon group having 7 to 40 carbon atoms, $X^{41}$ is a monovalent group which is $CH_2$=$C(-R^{42})$—$C$(=$O$)— wherein $R^{42}$ is a hydrogen atom or a methyl group, or a divalent group which is —$C(=O)$—$CH=CH$—$C(=O)$—, and r is 0 when $X^{41}$ is divalent, or is 1 when $X^{41}$ is monovalent.

$R^{41}$ is preferably a linear or branched hydrocarbon group. $R^{41}$ is preferably an alkyl group. The number of carbon atoms of $R^{41}$ is preferably 12 to 40, particularly 16 to 24 or 18 to 24.

$X^{41}$ is a monovalent group which is $CH_2$=$C(-R^{42})$—$C$(=$O$)— wherein $R^{42}$ is a hydrogen atom or a methyl group, or a divalent group which is —$C(=O)$—$CH=CH$—$C(=O)$—.

$R^{42}$ is a hydrogen atom or a methyl group, and is preferably a hydrogen atom, because the feeling becomes softer due to the hydrogen atom.

When $X^{41}$ is a divalent group which is —$C(=O)$—$CH=CH$—$C(=O)$—, the acrylamide monomer (A2-3) is maleimide (substituted maleimide).

An example of the acrylamide monomer (A2-3) is:

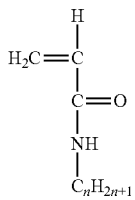

wherein n is a numeral of 7 to 40. This example is acrylamide, but the acrylamide monomer (A2-3) may be methacrylamide.

Other example of the acrylamide monomer (A2-3) is acrylimide. The acrylimide is, for example:

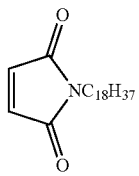

wherein $C_{18}H_{37}$ is one example of $C_nH_{2n+1}$ wherein n is a numeral of 7 to 40. This example is maleimide (N-substituted maleimide). This maleimide can be produced according to the following reaction formula:

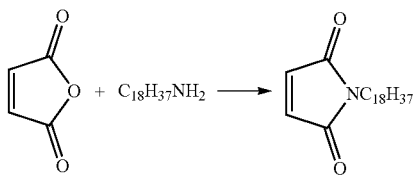

Specific examples of the acrylamide monomer (A2-3) are lauryl (meth)acrylamide, cetyl (meth)acrylamide, stearyl (meth)acrylamide, and behenyl (meth)acrylamide. Other specific examples of acrylamide monomers (A2-3) are N-laurylmaleimide, N-cetylmaleimide, N-stearylmaleimide and N-behenylmaleimide.

(A3) Further Monomer

The fluorine-containing polymer may further have, for example, a repeating unit derived from (A3) a repeating unit derived from a further monomer other than monomers (A1) and (A2).

The further monomer (A3) is, for example, (A3-1) the fluorine-free non-crosslinkable monomer and (A3-2) the fluorine-free crosslinkable monomer.

(A3-1) Fluorine-Free Non-Crosslinkable Monomer

The fluorine-free non-crosslinkable monomer (A3-1) is a monomer other than the fluorine-free monomer (A2). The fluorine-free non-crosslinkable monomer is a monomer comprising no fluorine atom. The fluorine-free non-crosslinkable monomer does not have a crosslinkable functional group. The fluorine-free non-crosslinkable monomer is non-crosslinkable unlike the crosslinkable monomer. The fluorine-free non-crosslinkable monomer is preferably a fluorine-free monomer having an ethylenic carbon-carbon double bond. The fluorine-free non-crosslinkable monomer is preferably a vinyl monomer free from fluorine. The fluorine-free non-crosslinkable monomer is generally a compound having one ethylenic carbon-carbon double bond.

The preferred fluorine-free non-crosslinkable monomer (A3-1) is a compound represented by the formula:

$$CH_2=CA\text{-}T$$

wherein A is a hydrogen atom, a methyl group, or a halogen atom other than a fluorine atom, such as a chlorine atom, a bromine atom, and an iodine atom, T is a hydrogen atom, a chain or cyclic hydrocarbon group having 1 to 40 carbon atoms, or a chain or cyclic organic group having 1 to 41 carbon atoms and having an ester bond.

The chain or cyclic hydrocarbon group having 1 to 40 carbon atoms includes, for example, a linear or branched aliphatic hydrocarbon group having 1 to 40 carbon atoms, a cyclic aliphatic group having 4 to 40 carbon atoms, an aromatic hydrocarbon group having 6 to 40 carbon atoms, or an aromatic-aliphatic hydrocarbon group having 7 to 40 carbon atoms.

The chain or cyclic organic group having 1 to 41 carbon atoms and having an ester bond is, for example, —C(=O)—O-Q and —O—C(=O)-Q wherein Q is a linear or branched aliphatic hydrocarbon group having 1 to 40 carbon atoms, a cyclic aliphatic group having 4 to 40 carbon atoms, an aromatic hydrocarbon group having 6 to 40 carbon atoms, and an aromatic-aliphatic hydrocarbon group having 7 to 40 carbon atoms.

The preferred fluorine-free non-crosslinkable monomer (A3-1) includes, for example, ethylene, vinyl acetate, acrylonitrile, styrene, polyethylene glycol (meth)acrylate, polypropylene glycol (meth)acrylate, methoxypolyethylene glycol (meth)acrylate, methoxypolypropylene glycol (meth)acrylate, and vinyl alkyl ether. The fluorine-free non-crosslinkable monomers are not limited to these examples.

The fluorine-free non-crosslinkable monomer (A3-1) may be, for example, a (meth)acrylate ester having an alkyl group. The number of carbon atoms in the alkyl group may be, for example, 1 to 40. The number of carbon atoms in the alkyl group may be 7 to 40, for example, 10 to 36, particularly 12 to 32, and specially 14 to 30. The fluorine-free non-crosslinkable monomer may be, for example, an acrylate represented by the formula:

$$CH_2=CA^1COOA^2$$

wherein $A^1$ is a hydrogen atom, a methyl group, or a halogen atom other than a fluorine atom, such as a chlorine atom, a bromine atom, and an iodine atom, and $A^2$ is an alkyl group represented by the formula: $C_nH_{2n+1}$ wherein n=1 to 40.

The preferred specific examples of the (meth)acrylate ester monomers are lauryl (meth)acrylate, stearyl (meth)acrylate, and behenyl (meth)acrylate with stearyl (meth)acrylate being particularly preferred.

The presence of the (meth)acrylate ester monomer enhances the water repellency, oil repellency and feeling imparted by the fluorine-containing polymer.

The fluorine-free non-crosslinkable monomer (A3-1) may be, for example, a (meth)acrylate monomer having a cyclic hydrocarbon group. The (meth)acrylate monomer having the cyclic hydrocarbon group is a compound having a (preferably monovalent) cyclic hydrocarbon group and a monovalent (meth)acrylate group. The monovalent cyclic hydrocarbon group and the monovalent (meth)acrylate group are directly bonded. The cyclic hydrocarbon group includes a monocyclic group, a polycyclic group, and a bridged ring group, which are saturated or unsaturated. The cyclic hydrocarbon group is preferably saturated. The cyclic hydrocarbon group preferably has 4 to 20 carbon atoms. The cyclic hydrocarbon group includes a cyclic aliphatic group having 4 to 20 carbon atoms, particularly 5 to 12 carbon atoms, an aromatic group having 6 to 20 carbon atoms, and an aromatic aliphatic group having 7 to 20 carbon atoms. The number of carbon atoms of the cyclic hydrocarbon group is preferably 15 or less, and, for example, particularly preferably 10 or less. Preferably, the carbon atom in the ring of the cyclic hydrocarbon group is directly bonded to an ester group in a (meth)acrylate group. The cyclic hydrocarbon group is preferably a saturated cyclic aliphatic group.

Specific examples of the cyclic hydrocarbon groups are a cyclohexyl group, a t-butylcyclohexyl group, an isobornyl group, a dicyclopentanyl group, a dicyclopentenyl group, and an adamantyl group. The acrylate group is preferably an acrylate group or a methacrylate group, and a methacrylate group is particularly preferred. Specific examples of a monomer having the cyclic hydrocarbon group include cyclohexyl (meth)acrylate, t-butylcyclohexyl (meth)acrylate, benzyl (meth)acrylate, isobornyl (meth)acrylate, dicyclopentanyl (meth)acrylate, dicyclopentenyl (meth)acrylate, dicyclopentanyloxyethyl (meth)acrylate, tricyclopentanyl (meth)acrylate, adamantyl (meth)acrylate, 2-methyl-2-adamantyl (meth)acrylate, and 2-ethyl-2-adamantyl (meth)acrylate.

The fluorine-free non-crosslinkable monomer (A3-1) may be, for example, a halogenated olefin. The halogenated olefin may be, for example, a halogenated olefin having 2 to 20 carbon atoms, substituted with 1 to 10 chlorine atoms, bromine atoms or iodine atoms. The halogenated olefin is preferably a chlorinated olefin having 2 to 20 carbon atoms, particularly an olefin having 1 to 5 chlorine atoms, and having 2 to 5 carbon atoms. Preferred specific examples of the halogenated olefin are vinyl halides, such as vinyl chloride, vinyl bromide, vinyl iodide, and vinylidene halides, such as vinylidene chloride, vinylidene bromide, and vinylidene iodide.

(A3-2) Fluorine-Free Crosslinkable Monomer

The fluorine-containing polymer may have, for example, a repeating unit derived from the fluorine-free crosslinkable monomer (A3-2). The fluorine-free crosslinkable monomer is a monomer comprising no fluorine atom. The fluorine-free crosslinkable monomer may be, for example, a compound having at least two reactive groups and/or ethylenic carbon-carbon double bonds and comprising no fluorine. The fluorine-free crosslinkable monomer may be, for example, a compound having at least two ethylenic carbon-carbon double bonds, or a compound having at least one ethylenic carbon-carbon double bond and at least one reactive group. Examples of the reactive group include a hydroxyl group, an epoxy group, a chloromethyl group, a blocked isocyanate group, an amino group, and a carboxyl group.

The fluorine-free crosslinkable monomer (A3-2) includes, for example, diacetone acrylamide, (meth)acrylamide, N-methylol acrylamide, hydroxymethyl (meth)acrylate, hydroxyethyl (meth)acrylate, 3-chloro-2-hydroxypropyl (meth)acrylate, 2-acetoacetoxyethyl (meth)acrylate, N,N-dimethylaminoethyl (meth)acrylate, N,N-diethylaminoethyl (meth)acrylate, butadiene, isoprene, chloroprene, and glycidyl (meth)acrylate, but it is not limited thereto.

By copolymerizing the fluorine-free non-crosslinkable monomer and/or the fluorine-free crosslinkable monomer, various properties, such as water- and oil-repellency, antifouling property, cleaning durability and washing durability thereof, solubility in a solvent, hardness, and a feel, can be improved as needed.

The monomer can be polymerized in the presence or absence of at least one compound selected from the group consisting of a blocked isocyanate compound and an organopolysiloxane compound. The amount of the blocked isocyanate compound (or the organopolysiloxane compound) may be 0 to 100 parts by weight, for example, 1 to 50 parts by weight, based on 100 parts by weight of the monomer.

By polymerizing the monomer in the presence of the blocked isocyanate compound, a polymer having a blocked isocyanate group can be obtained. The blocked isocyanate compound is an isocyanate which is blocked by at least one blocking agent. Examples of the blocking agent includes oximes, phenols, alcohols, mercaptans, amides, imides, imidazoles, ureas, amines, imines, pyrazoles, and active methylene compounds. Other examples of the blocking agent include pyridinols, thiophenols, diketones and esters. The blocked isocyanate compound may be modified with a compound having a hydrophilic group.

By polymerizing the monomer in the presence of the organopolysiloxane compound (for example, a mercapto-functional organopolysiloxane, a vinyl-functional organopolysiloxane), a polymer having a siloxane group can be obtained. In one embodiment, the mercapto-functional organopolysiloxane has a siloxy unit having the following average formula:

$$(R^2SiO)_a(RR^NSiO)_b(RR^SSiO)_c$$

wherein a is 0 to 4,000, or 0 to 1,000, or 0 to 400,
b is 1 to 1,000, or 1 to 100, or 1 to 50, and
c is 1 to 1,000, or 1 to 100, or 1 to 50;
R is independently a monovalent organic group, or R is a hydrocarbon having 1 to 40 carbon atoms, or R is a monovalent alkyl group having 1 to 12 carbon atoms, or R is a methyl group;
$R^N$ is a monovalent amino-functional organic group, and
$R^S$ is a monovalent mercapto-functional organic group.

Particularly preferred combinations of the monomers in the fluorine-containing polymer are as follows:

fluorine-containing monomer (A1)+fluorine-free monomer (A2), and fluorine-containing monomer (A1)+fluorine-free monomer (A2)+a further monomer (A3).

The amount of the fluorine-containing monomer (A1) may be 0.1 to 95% by weight, for example, 1 to 85% by weight, particularly 20 to 80% by weight, and specially 25 to 75% by weight,
the amount of the fluorine-free monomer (A2) may be 0.1 to 95% by weight, for example 1 to 85% by weight, particularly 20 to 80% by weight, and specially 25 to 75% by weight, and
the amount of the further monomer (A3) may be 0 to 80% by weight, for example, 0.1 to 60% by weight, particularly 1 to 50% by weight, and specially 5 to 40% by weight, based on the fluorine-containing polymer.

Alternatively, in the fluorine-containing polymer, the amount of the fluorine-containing monomer (A1) is 0.1 to 95 parts by weight, for example, 1 to 90 parts by weight, particularly 20 to 80 parts by weight,
the amount of the fluorine-free monomer (A2) is 5 to 99.1 parts by weight, for example, 10 to 99 parts by weight, particularly 20 to 80 parts by weight,
the amount of the fluorine-free non-crosslinkable monomer (A3-1) is 1,000 parts by weight or less, for example, 0.1 to 300 parts by weight, particularly 1 to 200 parts by weight, and
the amount of the fluorine-free crosslinkable monomer (A3-2) is 50 parts by weight or less, for example, 30 parts by weight or less, particularly 0.1 to 20 parts by weight,
based on 100 parts by weight of the total of the fluorine-containing monomer (A1) and the fluorine-free monomer (A2).

The weight-average molecular weight (Mw) of the fluorine-containing polymer may be generally, for example, 1,000 to 1,000,000, for example 2,000 to 500,000, particularly 3,000 to 300,000. The weight average molecular weight (Mw) of the fluorine-containing polymer is generally measured by GPC (gel permeation chromatography).

In the present description, the acrylic monomer is generally (meth)acrylate or (meth)acrylamide.

As used herein, "(meth)acrylate" refers to acrylate or methacrylate, and "(meth)acrylamide" refers to acrylamide or methacrylamide.

(B) Liquid Medium

The water repellent agent composition comprises a liquid medium. The liquid medium is an organic solvent, or water, or a mixture of water and an organic solvent.

The water repellent agent composition is generally a solution or a dispersion. The solution is a solution in which a polymer is dissolved in the organic solvent. The dispersion is an aqueous dispersion in which a polymer is dispersed in an aqueous medium (water or a mixture of water and an organic solvent).

The organic solvent is, for example, esters (for example, esters having 2 to 40 carbon atoms, specifically ethyl acetate and butyl acetate), ketones (for example, ketones having 2 to 40 carbon atoms, specifically methyl ethyl ketone and diisobutyl ketones), alcohols (for example, alcohols having 1 to 40 carbon atoms, specifically isopropyl alcohol), aromatic solvents (for example, toluene and xylene), petroleum solvent (for example, alkanes having 5 to 10 carbon atoms, specifically naphtha and kerosene).

The liquid medium may be, for example, water alone or a mixture of water and a (water-miscible) organic solvent. The amount of the organic solvent may be, 30% by weight or less, for example, 10% by weight or less (preferably 0.1% by weight or more), based on the liquid medium. The liquid medium is preferably water alone.

(C) Surfactant

When a water repellent agent composition is an aqueous dispersion, it preferably comprises a surfactant.

In the water repellent agent composition, the surfactant comprises a nonionic surfactant. Further, the surfactant preferably comprises one or more surfactants selected among from a cationic surfactant, an anionic surfactant, and an amphoteric surfactant. The surfactant may comprise or consist of, for example, a nonionic surfactant, or may be a combination of the nonionic surfactant and the cationic surfactant.

(C1) Nonionic Surfactant

The nonionic surfactant (C1) includes, for example, an ether, an ester, an ester ether, an alkanolamide, a polyhydric alcohol, and an amine oxide.

The ether is, for example, a compound having an oxyalkylene group (preferably a polyoxyethylene group).

The ester is, for example, an ester of an alcohol and a fatty acid. The alcohol is, for example, an alcohol which is monohydric to hexahydric (particularly dihydric to pentahydric) and has 1 to 50 carbon atoms (particularly 10 to 30 carbon atoms) (for example, an aliphatic alcohol). The fatty acid is, for example, a saturated or unsaturated fatty acid having 2 to 50 carbon atoms, particularly 5 to 30 carbon atoms.

The ester ether is, for example, a compound in which an alkylene oxide (particularly ethylene oxide) is added to an ester of an alcohol and a fatty acid. The alcohol is, for example, an alcohol which is monohydric to hexahydric (particularly dihydric to pentahydric) and has 1 to 50 carbon atoms (particularly 3 to 30 carbon atoms) (for example, an aliphatic alcohol). The fatty acid is, for example, a saturated or unsaturated fatty acid having 2 to 50 carbon atoms, particularly 5 to 30 carbon atoms.

The alkanolamide is formed from, for example, a fatty acid and an alkanolamine. The alkanolamide may be a monoalkanolamide or a dialkanolamino. The fatty acid is a saturated or unsaturated fatty acid having 2 to 50 carbon atoms, particularly 5 to 30 carbon atoms. The alkanolamine may be, for example, an alkanol with 1 to 3 amino groups and 1 to 5 hydroxyl groups, having 2 to 50 carbon atoms, particularly 5 to 30 carbon atoms.

The polyhydric alcohol may be, for example, a dihydric to pentahydric alcohol having 10 to 30 carbon atoms.

The amine oxide may be an oxide of an amine (a secondary amine or preferably a tertiary amine) (for example, the one having 5 to 50 carbon atoms).

The nonionic surfactant (Cl) is preferably a nonionic surfactant having an oxyalkylene group (preferably a polyoxyethylene group). The alkylene group in the oxyalkylene group preferably has 2 to 10 carbon atoms. The number of oxyalkylene groups in the molecule of the nonionic surfactant is generally preferably 2 to 100.

The nonionic surfactant is selected from the group consisting of an ether, an ester, an ester ether, an alkanolamide, a polyhydric alcohol and an amine oxide, and is preferably a nonionic surfactant having an oxyalkylene group.

The nonionic surfactant (Cl) may be an alkylene oxide adduct of a linear and/or branched aliphatic group (saturated and/or unsaturated), a polyalkylene glycol ester of a linear and/or branched fatty acid (saturated and/or unsaturated), a polyoxyethylene (POE)/polyoxypropylene (POP) copolymer (random copolymer or block copolymer), or an alkylene oxide adduct of an acetylene glycol. Among these, the structures of the alkylene oxide addition moiety and the polyalkylene glycol moiety are each preferably the polyoxyethylene (POE) or the polyoxypropylene (POP) or the POE/POP copolymer (it may be, for example, a block copolymer or a random copolymer).

Moreover, the nonionic surfactant preferably has a structure free from an aromatic group due to the environmental problems (such as biodegradability, and environmental hormones).

The nonionic surfactant (Cl) may be, for example, a compound represented by the formula:

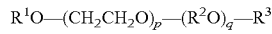

$R^1O{-}(CH_2CH_2O)_p{-}(R^2O)_q{-}R^3$ wherein $R^1$ is an alkyl group having 1 to 22 carbon atoms or an alkenyl group or an acyl group having 2 to 22 carbon atoms, $R^2$ is each independently the same or different and is an alkylene group having 3 or more carbon atoms (for example, 3 to 10), $R^3$ is a hydrogen atom, an alkyl group having 1 to 22 carbon atoms or an alkenyl group having 2 to 22 carbon atoms, p is a numeral of 2 or greater, q is a numeral of 0, or 1 or greater.

$R^1$ preferably has 8 to 20 carbon atoms, particularly 10 to 18 carbon atoms. Preferred specific examples of $R^1$ include a lauryl group, a tridecylic group, and an oleyl group.

$R^2$ is, for example, a propylene group and a butylene group.

In the nonionic surfactant, for example, p may be a numeral of 3 or more (for example, 5 to 200) and q may be a numeral of 2 or more (for example, 5 to 200). Namely, $-(R^2O)_q-$ may form, for example, a polyoxyalkylene chain.

The nonionic surfactant may be, for example, a polyoxyethylene alkylene alkyl ether comprising a hydrophilic polyoxyethylene chain and a hydrophobic oxyalkylene chain (particularly a polyoxyalkylene chain) in the center. The hydrophobic oxyalkylene chain includes, for example, an oxypropylene chain, an oxybutylene chain, and a styrene chain. The oxypropylene chain is preferred among them.

Specific examples of the nonionic surfactant include condensation products of ethylene oxide with hexylphenol, isooctylphenol, hexadecanol, oleic acid, an alkane ($C_{12}$ to $C_{16}$) thiol, a sorbitan monofatty acid ($C_7$ to $C_{19}$) or an alkyl ($C_{12}$ to $C_{18}$) amine.

The proportion of the polyoxyethylene block can be 5 to 80% by weight, for example, 30 to 75% by weight, particularly 40 to 70% by weight, based on a molecular weight of the nonionic surfactant (copolymer).

The average molecular weight of the nonionic surfactant is generally 300 to 5,000, for example, 500 to 3,000.

The nonionic surfactant may be, for example, a single type or a mixture of two or more types.

(C2) Cationic Surfactant

The cationic surfactant (C2) is preferably a compound having no amide group.

The cationic surfactant (C2) may be, for example, an amine salt, a quaternary ammonium salt, or an oxyethylene-added ammonium salt. Specific examples of the cationic surfactants are not limited, but include amine salt-type surfactants, such as an alkylamine salt, an aminoalcohol fatty acid derivative, a polyamine fatty acid derivative, and imidazoline; and quaternary ammonium salt-type surfactants, such as an alkyltrimethylammonium salt, a dialkyldimethylammonium salt, an alkyldimethylbenzylammonium salt, a pyridinium salt, an alkylisoquinolinium salt, and benzethonium chloride.

A preferred example of the cationic surfactant (C2) is a compound represented by the formula:

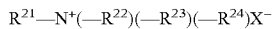

$R^{21}{-}N^+({-}R^{22})({-}R^{23})({-}R^{24})X^-$ wherein $R^{21}$, $R^{22}$, $R^{23}$ and $R^{24}$ are hydrocarbon groups having 1 to 40 carbon atoms and X is an anionic group.

Specific examples of $R^{21}$, $R^{22}$, $R^{23}$ and $-R^{24}$ are alkyl groups (for example, a methyl group, a butyl group, a stearyl group, and a palmityl group). Specific examples of X are halogens (for example, chlorine) and acids (for example, hydrochloric acid and acetic acid).

The cationic surfactant is particularly preferably a monoalkyltrimethylammonium salt (with an alkyl having 4 to 40 carbon atoms).

The cationic surfactant (C2) is preferably an ammonium salt. The cationic surfactant may be, for example, an ammonium salt represented by the formula:

$$R^1_p\text{—}N^+R^2_q X^-$$

wherein $R^1$ is a linear and/or branched aliphatic (saturated and/or unsaturated) group of $C_{12}$ or higher (for example, $C_{12}$ to $C_{50}$), $R^2$ is H or an alkyl group of $C_1$ to $C_4$, a benzyl group, or a polyoxyethylene group (the number of oxyethylene groups is, for example, 1 (particularly 2, specially 3) to 50) ($CH_3$ and $C_2H_5$ are particularly preferred), X is a halogen atom (for example, chlorine), a fatty acid salt group of C1 to $C_4$, p is 1 or 2, q is 2 or 3, and p+q=4. The number of carbon atoms of $R^1$ may be 12 to 50, for example, 12 to 30.

Specific examples of the cationic surfactant (C2) include dodecyltrimethylammonium acetate, trimethyltetradecylammonium chloride, hexadecyltrimethylammonium bromide, trimethyloctadecylammonium chloride, (dodecylmethylbenzyl) trimethylammonium chloride, benzyldodecyldimethylammonium chloride, methyldodecyldi(hydropolyoxyethylene)ammonium chloride, benzyldodecyldi (hydropolyoxyethylene)ammonium chloride, N-[2-(diethylamino)ethyl] oleamide hydrochloride salt.

The amphoteric surfactant includes, for example, alanines, imidazolinium betaines, amide betaines, and betaine acetate. Specific examples of the amphoteric surfactant include lauryl betaine, stearyl betaine, laurylcarboxymethyl hydroxyethyl imidazolinium betaine, lauryldimethylaminoacetic acid betaine, and fatty acid amide propyldimethylaminoacetic acid betaine.

Each of the nonionic surfactant, the cationic surfactant, and the amphoteric surfactant may be, for example, one type or a combination of two or more thereof.

The amount of the cationic surfactant may be, for example, 5% by weight or more, preferably 10% by weight or more, and more preferably 20% by weight or more, based on the total amount of the surfactants. The weight ratio of the nonionic surfactant and the cationic surfactant is preferably 95:5 to 20:80 and more preferably 85:15 to 40:60.

The amount of the cationic surfactant may be 0.05 to 10 parts by weight, for example, 0.1 to 8 parts by weight, based on 100 parts by weight of the polymer. The total amount of the surfactants may be 0.1 to 20 parts by weight, for example, 0.2 to 10 parts by weight, based on 100 parts by weight of the polymer.

(D) Other Components

The surface treatment agent may comprise, for example, at least one of a fluorine-free water repellent compound and an additive as other components other than the fluorine-containing polymer, the liquid medium and the surfactant.

(D1) Fluorine-Free Water Repellent Compound

The surface treatment agent may comprise a water-repellent compound comprising no fluorine atom (fluorine-free water-repellent compound).

The fluorine-free water-repellent compound may be, for example, a fluorine-free acrylate polymer, a saturated or unsaturated hydrocarbon compound, or a silicone-based compound.

The fluorine-free acrylate polymer is a homopolymer composed of one type of fluorine-free acrylate monomer, or a copolymer composed of at least two types of fluorine-free acrylate monomers, or a copolymer composed of at least one type of fluorine-free monomer and at least one other fluorine-free monomer (ethylenically unsaturated compound, for example, an ethylene- or vinyl-based monomer).

The fluorine-free acrylate monomer constituting the fluorine-free acrylate polymer is a compound represented by the formula:

$$CH_2\text{=}CA\text{-}T$$

wherein A is a hydrogen atom, a methyl group, or a halogen atom other than a fluorine atom, such as a chlorine atom, a bromine atom, and an iodine atom, T is a hydrogen atom, a chain or cyclic hydrocarbon group having 1 to 40 carbon atoms, or a chain or cyclic organic group having 1 to 41 carbon atoms and having an ester bond.

The chain or cyclic hydrocarbon groups having 1 to 40 carbon atoms include, for example, a linear or branched aliphatic hydrocarbon group having 1 to 40 carbon atoms, a cyclic aliphatic group having 4 to 40 carbon atoms, an aromatic hydrocarbon group having 6 to 40 carbon atoms, and an aromatic-aliphatic hydrocarbon group having 7 to 40 carbon atoms.

The chain or cyclic organic group having 1 to 41 carbon atoms and having an ester bond is, for example, —C(=O)—OQ and —O—C(=O)-Q wherein Q is a linear or branched aliphatic hydrocarbon group having 1 to 40 carbon atoms, a cyclic aliphatic group having 4 to 40 carbon atoms, an aromatic hydrocarbon group having 6 to 40 carbon atoms, and an aromatic-aliphatic hydrocarbon group having 7 to 40 carbon atoms.

The fluorine-free acrylate monomer includes, for example, an alkyl (meth)acrylate, polyethylene glycol (meth)acrylate, polypropylene glycol (meth)acrylate, methoxypolyethylene glycol (meth)acrylate, methoxypolypropylene glycol (meth)acrylate.

The fluorine-free acrylate monomer is preferably an alkyl (meth)acrylate ester. The number of carbon atoms of the alkyl group may be 1 to 40, for example, 6 to 40 (for example, 10 to 30). Specific examples of the fluorine-free acrylate monomers are lauryl (meth)acrylate, stearyl (meth)acrylate and behenyl (meth)acrylate.

The fluorine-free acrylate polymer can be produced by the same polymerization method as the fluorine-containing polymer.

The saturated or unsaturated hydrocarbon-based compound is preferably a saturated hydrocarbon. The saturated or unsaturated hydrocarbon-based compound may have the number of carbon atoms of 15 or more, preferably 20 to 300, for example 25 to 100. Specific examples of the saturated or unsaturated hydrocarbon-based compound include paraffin.

The silicone-based compound is generally used as a water repellent agent. The silicone-based compound is not limited provided that it is a compound exhibiting water repellency.

The amount of the fluorine-free water-repellent compound may be 500 parts by weight or less, for example, 5 to 200 parts by weight, particularly 5 to 100 parts by weight, based on 100 parts by weight of the fluorine-containing polymer.

(D2) Additive

The surface treatment agent may comprise additives.

Examples of the additive include a silicon-containing compound, wax, and an acrylic emulsion. Other examples of the additive include, other fluorine-containing polymers, a drying rate adjuster, a cross-linking agent, a film formation agent, a compatibilizing agent, a surfactant, an antifreezing agent, a viscosity modifier, a UV absorber, an antioxidant, a pH adjuster, an antifoaming agent, a feeling modifier, a slippage modifier, an antistatic agent, a hydrophilizing agent, an antibacterial agent, a preservative, an insect repellent, a fragrant agent, and a flame retarder.

The fluorine-containing polymer in the present disclosure can be produced by any of the usual polymerization methods, and the conditions of the polymerization reaction can also be arbitrarily selected. Such a polymerization method includes solution polymerization, suspension polymerization, and emulsion polymerization.

In the solution polymerization, there can be used a method of dissolving the monomer(s) into an organic solvent in the presence of a polymerization initiator, replacing the atmosphere by nitrogen, and stirring the mixture with heating at the temperature within the range from 30° C. to 120° C. for 1 hour to 10 hours. Examples of the polymerization initiator includes azobisisobutyronitrile, benzoyl peroxide, di-t-butyl peroxide, lauryl peroxide, cumene hydroperoxide, t-butyl peroxypivalate, and diisopropyl peroxydicarbonate. The polymerization initiator is used in the range of 0.01 to 20 parts by weight, for example, 0.01 to 10 parts by weight, based on 100 parts by weight of the monomer.

The organic solvent is inert to the monomers and dissolves them, and it may be, for example, esters (for example, esters having 2 to 40 carbon atoms, specifically ethyl acetate, butyl acetate), ketones (for example, ketones having 2 to 40 carbon atoms, specifically methyl ethyl ketone or diisobutyl ketone), or alcohols (for example, alcohols having 1 to 40 carbon atoms, specifically isopropyl alcohol). Specific examples of the organic solvents include acetone, chloroform, HCHC225, isopropyl alcohol, pentane, hexane, heptane, octane, cyclohexane, benzene, toluene, xylene, petroleum ether, tetrahydrofuran, 1,4-dioxane, methyl ethyl ketone, methyl isobutyl ketone, diisobutyl ketone, ethyl acetate, butyl acetate, 1,1,2,2-tetrachloroethane, 1,1,1-trichloroethane, trichlorethylene, perchloroethylene, tetrachlorodifluoroethane, and trichlorotrifluoroethane. The organic solvent is used in the range of 10 to 2,000 parts by weight, for example, 50 to 1,000 parts by weight, based on 100 parts by weight of the monomer in total.

In the emulsion polymerization, there can be used a method of emulsifying monomers in water in the presence of a polymerization initiator and an emulsifying agent, replacing the atmosphere by nitrogen, and copolymerizing with stirring, for example, at the temperature within the range from 50° C. to 80° C. for 1 hour to 20 hours. The polymerization initiators, water-soluble substances, such as benzoyl peroxide, lauroyl peroxide, t-butyl perbenzoate, 1-hydroxycyclohexylhydro peroxide, 3-carboxypropionyl peroxide, acetyl peroxide, azobisisobutyamidine-dihydrochloride salt, sodium peroxide, potassium persulfate, and oil-soluble substances, such as azobisisobutyronitrile, benzoyl peroxide, di-t-butyl peroxide, lauryl peroxide, cumene hydroperoxide, t-butyl peroxypivalate, and diisopropylperoxydicarbonate, are used. The polymerization initiator is used in the range of 0.01 to 10 parts by weight, based on 100 parts by weight of the monomer.

In order to obtain an aqueous dispersion of polymer having excellent standing stability, it is desirable to micronize the monomer in water and then polymerize by using an emulsifying apparatus, such as a high-pressure homogenizer or an ultrasonic homogenizer which can apply intense crushing energy. Moreover, the emulsifying agent can be any of various types of anionic, cationic, and nonionic emulsifying agents, and is used in the range of 0.5 to 20 parts by weight, based on 100 parts by weight of the monomer. The anionic and/or nonionic and/or cationic emulsifying agents are preferably used. When the monomers are not completely compatible, a compatibilizer which sufficiently renders these monomers compatible, for example, a water-soluble organic solvent or a low molecular weight monomer, is preferably added. The addition of the compatibilizer can improve emulsifiability and copolymerizability.

The water-soluble organic solvent includes, for example, acetone, methyl ethyl ketone, ethyl acetate, propylene glycol, dipropylene glycol monomethyl ether, dipropylene glycol, tripropylene glycol, and ethanol. The water-soluble organic solvent may be used in the range of 1 to 50 parts by weight, for example, 10 to 40 parts by weight, based on 100 parts by weight of water. Moreover, the low molecular weight monomer includes, for example, methyl methacrylate, glycidyl methacrylate, and 2,2,2-trifluoroethyl methacrylate. The low molecular weight monomer may be used in the range of 1 to 50 parts by weight, for example, 10 to 40 parts by weight, based on 100 parts by weight of the total amount of the monomers.

A chain transfer agent may be used in the polymerization. The molecular weight of the polymer can be changed according to the amount of the chain transfer agent used. The chain transfer agent is, for example, mercaptan group-containing compounds, such as lauryl mercaptan, thioglycol, thioglycerol (particularly alkyl mercaptan (for example, with 1 to 40 carbon atoms)), and inorganic salts, such as sodium hypophosphite and sodium bisulfite. The amount of the chain transfer agent for use may be in the range of 0.01 to 10 parts by weight, for example, 0.1 to 5 parts by weight, based on 100 parts by weight of the total amount of the monomers.

The surface treatment agent may be in the form of a solution, an emulsion (particularly an aqueous dispersion) or an aerosol, and is preferably an aqueous dispersion. The treatment agent comprises the fluorine-containing polymer (an active ingredient of the surface treatment agent) and a medium (particularly a liquid medium, for example, an organic solvent and/or water). The amount of the medium may be, for example, 5 to 99.9% by weight, particularly 10 to 80% by weight, based on the treatment agent.

The surface treatment agent may have the fluorine-containing polymer at a concentration of 0.01 to 95% by weight, 0.1 to 60% by weight, for example, 5 to 50% by weight.

The surface treatment agent can be used as a water repellent agent, an oil repellent agent, a soil resistant agent, a soil release agent, a peel agent (a release agent) and a mold release agent.

The surface treatment agent can be applied to a substrate to be treated by a conventionally known method. Usually, there can be used a method for dispersing and diluting the treatment agent in an organic solvent or water, adhering it to the surface of the substrate to be treated by known procedures, such as dip coating, spray coating, and foam coating, followed by drying. Moreover, if necessary, for example, curing may be carried out together with a suitable cross-linking agent (for example, a blocked isocyanate). Further, it is also possible to add, to the surface treatment agent, an insect repellent, a softening agent, an antibacterial agent, a flame retarder, an antistatic agent, a paint fixing agent, and a wrinkle-resistant agent, to use in combination. The concentration of the fluorine-containing polymer in the treatment liquid to be brought into contact with the substrate may be 0.01 to 10% by weight (particularly in the case of the dip coating), for example, 0.05 to 10% by weight.

The substrate to be treated with the surface treatment agent (for example, a water- and oil-repellent agent) includes textile products, stones, filters (for example, electrostatic filters), dust masks, fuel cell parts (for example, gas diffusion electrodes and gas diffusion supports), glass, paper, wood, leather, fur, asbestos, bricks, cement, metals and oxides, ceramic products, plastics, coated surfaces, and plasters. Examples of the textile product may be various. Examples of the textile product include animal and vegetable natural fibers, such as cotton, hemp, wool and silk, synthetic fibers, such as polyamide, polyester, polyvinyl alcohol, polyacrylonitrile, polyvinyl chloride and polypropylene, semi-synthetic fibers, such as rayon and acetate, glass fibers, carbon fibers, inorganic fibers, such as asbestos fibers, or mixed fibers thereof.

The textile product may be in any form, such as fibers or fabric.

The treatment agent can impart desired releasability to the surface of the substrate, and therefore, the treatment agent facilitates to release the surface of the substrate from another surface (another surface of the substrate or a surface of another substrate).

The substrate to which the treatment agent is applied is, for example, textile products (for example, nonwoven fabrics and woven fabrics), paper, stones, leather, resins, glass, and metals. The substrate is preferably fabric or paper.

The treatment agent is used for release between similar substrates (for example, fabric to fabric, paper to paper), or release between different substrates (for example, fabric to resin, fabric to metal, paper to fabric, and paper to glass). The treatment agent can be used, for example, in production of protective materials for adhesive surfaces of adhesive sheets and adhesive tapes, and release films (peel films), release papers (peel papers), and sticky notes.

The surface treatment agent can also be used as an internal mold release agent or an external mold release agent.

The fluorine-containing polymer can be applied to fibrous substrates (for example, textile products) by any of the methods known for treating textile products with liquids. When the textile product is fabric, for example, the fabric may be dipped in the solution, or the solution may be attached or sprayed onto the fabric. The treated textile product is dried and preferably heated at, for example, 100° C. to 200° C. in order to exhibit oil repellency.

Alternatively, the fluorine-containing polymer may be applied to, for example, textile products by a cleaning method, and may be applied to textile products by, for example, washing application or a dry cleaning method.

The textile products to be treated are typically fabrics, which include woven fabrics, knitted fabrics, nonwoven fabrics, and fabrics in the form of clothing and carpets, but these may be, for example, fibers or yarns or intermediate fiber products (for example, slivers or blister yarns). The textile product materials may be, for example, natural fibers (for example, cotton or wool), chemical fibers (for example, viscose rayon or lyocell), or synthetic fibers (for example, polyester, polyamide or acrylic fibers), or a mixture of fibers (for example, a mixture of natural and synthetic fibers). The fluorine-containing polymers of the present disclosure are particularly effective in rendering cellulosic fibers (for example, cotton or rayon) oleophobic and oil repellent. Moreover, the methods of the present disclosure generally render the textile products hydrophobic and water repellent.

Alternatively, the fibrous substrate may be, for example, leather. The fluorine-containing polymer may be applied to, for example, the leather by using a water-soluble emulsion or an aqueous emulsion in order to render the leather hydrophobic and oleophobic, at various stages of leather processing, for example, during a wet processing of the leather or during finishing of the leather.

Alternatively, the fibrous substrate may be, for example, paper. The fluorine-containing polymer may be applied to, for example, paper which was preliminarily molded, or may be applied at various stages of papermaking, for example during a drying period of the paper.

The term "treatment" means that the treatment agent is applied to the substrate by, for example, immersion, spray or coating. The treatment gives the result that the polymer which is an active component of the treatment agent is penetrated into internal parts of the substrate and/or adhered to surfaces of the substrate.

EXAMPLES

The present disclosure will be described in more detail below by way to Examples, but the present disclosure is not limited to these Examples.

Parts or % or ratios denote parts by weight or % by weight or ratios by weight, respectively unless otherwise specified below.

The test procedures are as follows.
Water Repellency Test

Water repellency was evaluated with a heat-treated test fabric by preparing a treatment solution having a solid content concentration of 0.3 to 2.0%, dipping the fabric in this test solution, and passing through a mangle. The water repellency of the treated fabric was evaluated according to the spray method of JIS-L-1092 (AATCC-22). As shown in the table below, the water repellency was ranked in terms of the score of the water repellency No. below, which indicates that the higher the score, the better the water repellency.

| Water repellency No. | State |
| --- | --- |
| 100 | No wet or water droplets adhesion on surface |
| 90 | No wet but small water droplets adhesion on surface |
| 80 | Separate small water droplets-like wet on surface |
| 70 | Wet on half of surface and separate small wet which penetrates fabric |
| 50 | Wet on whole surface |
| 0 | Wet on front and back whole surfaces |

Oil Repellency Test (According to AATCC Test Method 118-1992)

The treated test fabric is stored in a constant temperature and humidity chamber at a temperature of 21° C. and a humidity of 65% for 4 hours or longer. The test solution stored at a temperature of 21° C. is used. The test is carried out in the constant temperature and humidity chamber at a temperature of 21° C. and a humidity of 65%. 0.05 ml of the test solution is gently dropped onto the test fabric and the solution was left as was for 30 seconds, and then, if the droplet remains on the test fabric, the test solution is evaluated as acceptable. The oil repellency is evaluated for the highest score of the accepted test solution with 9-stage scores of Fail, 1, 2, 3, 4, 5, 6, 7 and 8 from a poor oil repellency to a good level.

| Oil repellency test solution | | |
| --- | --- | --- |
| Score | Test solution | Surface tension (dyne/cm, 25° C.) |
| 8 | n-Heptane | 20.0 |
| 7 | n-Octane | 21.8 |
| 6 | n-Decan | 23.5 |
| 5 | n-Dodecane | 25.0 |

-continued

Oil repellency test solution

| Score | Test solution | Surface tension (dyne/cm, 25° C.) |
|---|---|---|
| 4 | n-Tetradecane | 26.7 |
| 3 | n-Hexadecane | 27.3 |
| 2 | Mixture of n-hexadecane 35/Nujor 65 | 29.6 |
| 1 | Nujor | 31.2 |
| Fail | Does not reach 1 | — |

Washing Durability of Water- and Oil-Repellency

Washing according to the JIS L-0217-103 method is repeated 10 times, and then the water- and oil-repellency is evaluated (HL10).

In the Synthesis Examples and Examples, the abbreviations refer to as follows.

| Abbreviation | Compound name |
|---|---|
| 13FA | $CF_3CF_2\!-\!(CF_2CF_2)_n\!-\!CH_2CH_2OCOC(H)\!=\!CH_2$ (average of n = 2) |
| 13FMA | $CF_3CF_2\!-\!(CF_2CF_2)_n\!-\!CH_2CH_2OCOC(CH_3)\!=\!CH_2$ (average of n = 2) |
| 13FCLA | $CF_3CF_2\!-\!(CF_2CF_2)_n\!-\!CH_2CH_2OCOC(Cl)\!=\!CH_2$ (average of n = 2) |
| C18SHA | Stearic acid amidoethyl acrylate |
| C18URA | 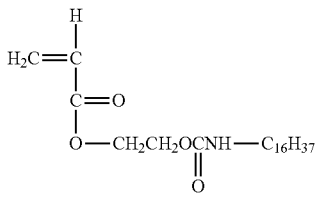 |
| C18UreaA | 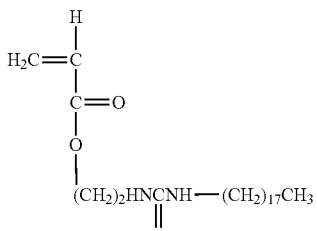 |
| C18AAm | 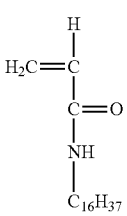 |
| C18MI | 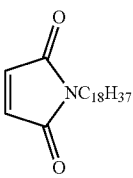 |
| StA | Stearyl acrylate |
| IBMA | Isobornyl methacrylate |
| HEA | Hydroxyethyl acrylate |
| 2-EHA | 2-Ethylhexyl acrylate |
| VCM | Vinyl chloride |

Synthesis Example 1

[Synthesis of C18URA (Stearyl Group-Containing Urethane Acrylate)]

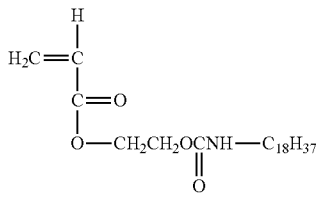

Into a 1 L four-necked flask, 80.2 g of hydroxyethyl acrylate, 100 g of ethyl acetate, 0.03 g of a polymerization inhibitor, and 0.03 g of a tin catalyst were charged. A stirring rod, a thermometer, and a reflux tube were set, and 201.4 g of octadecyl isocyanate was dissolved in 100 g of ethyl acetate and charged into a dropping funnel. The dropping funnel was set in the flask and the temperature was raised to 70° C. An ethyl acetate solution of octadecyl isocyanate was gradually added dropwise from the dropping funnel over about 30 minutes with attention to heat generation. After completion of the dropping, the reaction was carried out for another 2 hours. Disappearance of the isocyanate peak was confirmed by infrared spectroscopy (IR), and then the reaction was terminated. The reaction product was reprecipitated in methanol, washed with methanol, and dried under reduced pressure to obtain a white powder. The reaction product was identified as C18URA by 1H-NMR.

According to differential scanning calorimetry (DSC), the melting point of the compound was about 73° C.

Synthesis Example 2

[Synthesis of C18UreaA (Stearyl Group-Containing Urea Acrylate)]

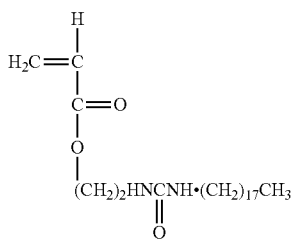

Into a 1 L four-necked flask, 200 g of stearylamine, 100 g of ethyl acetate, and 0.03 g of a polymerization inhibitor were charged. A stirring rod, a thermometer, and a reflux tube were set, and 2-acryloyloxyethyl isocyanate (CAS. No: 13641-96-8) was dissolved in 100 g of ethyl acetate and charged into a dropping funnel. The dropping funnel was set in a flask, and the ethyl acetate solution of 2-acryloyloxyethyl isocyanate was gradually dropped from the dropping funnel at room temperature over about 30 minutes with attention to heat generation. After completion of the dropping, the reaction was carried out for another 2 hours. By confirming disappearance of the isocyanate peak by infrared spectroscopy (IR), the reaction was terminated. The reaction product was reprecipitated in methanol, washed with methanol, and dried under reduced pressure to obtain a white powder. The reaction product was identified as C18UreaA by 1H-NMR. According to the differential scanning calorimetry (DSC), the melting point of the compound was about 83° C.

Synthesis Example 3

Synthesis of Mercapto Group-Containing Siloxane (Siloxane A):

To a three-necked round-bottom flask equipped with a cooler, an upper stirrer and a thermocouple, first silanol-terminated polydimethylsiloxane (323 g, Mn of about 900), second silanol-terminated polydimethylsiloxane (380 g, Mn of about 300), mercapto propylmethyldimethoxysilane (230 g), aminopropylmethyldiethoxysilane (27 g), trimethylethoxysilane (42 g), barium hydroxide (0.62 g) and sodium orthophosphate (0.25 g) were charged. The reaction mixture was heated to 75° C. and maintained at this temperature for 3 hours. Next, the volatiles were removed at 75° C. for 4 hours under reduced pressure (200 mbar) to obtain aminomercaptosiloxane (Siloxane A).

The physical and structural properties of aminomercaptosiloxane are described below:

| | Mn | Viscosity (cSt) | % N (w/w) | % SH (w/w) | %SiMe$_3$ end group | % OR end group or SiOH end group |
|---|---|---|---|---|---|---|
| Siloxane A | 4396 | 74 | 0.26 | 4.10 | 9 | 91 |

Example 1

In a 1 L autoclave, 145 g of $CF_3CF_2$—$(CF_2CF_2)_n$—$CH_2CH_2OCOC(CH_3)$=$CH_2$ (average of n is 2) (13FMA), 42.9 g of steric acid amidoethyl acrylate (C18SHA), 15.0 g of stearyl acrylate, 22.9 g of isobornyl methacrylate (IBMA), 1 g of hydroxyethyl acrylate, 1 g of 2-ethylhexyl acrylate, 22.8 g of aminomercaptosiloxane (Siloxane A), 398 g of pure water, 51.6 g of water-soluble glycol solvent (co-solvent), 8.83 g of polyoxyethylene oleyl ether, and 8.83 g of polyoxyethylene tridecyl ether were added, and the mixture was ultrasonically emulsified and dispersed at 60° C. for 15 minutes under stirring. After substituting the inside of the autoclave with nitrogen, 52.5 g of vinyl chloride (VCM) was press-injected. Further, 3.2 g of an azo group-containing water-soluble initiator was added as a polymerization initiator and the resultant mixture was reacted at 60° C. for 8 hours to obtain an aqueous dispersion of the polymer of the following formula. After the polymerization, the obtained dispersion was further diluted with pure water to prepare an aqueous dispersion having a solid content concentration of 30%.

Examples 2 to 6

The polymerization was carried out with the ingredients shown in Table 1 in the same manner as in Example 1, and after the polymerization, the dispersion was further diluted with pure water to prepare an aqueous dispersion having a solid content concentration of 30%.

Example 7

In a 500 mL flask equipped with a nitrogen introduction tube, a thermometer, a stirring rod, and a reflux tube, 72.0 g of 13FMA, 21.0 g of C18SHA, 14.0 g of Siloxane A, 190.0 g of pure water, 25.2 g of a water-soluble glycol solvent, 4.42 g of polyoxyethylene oleyl ether, and 4.42 g of polyoxyethylene tridecyl ether, were added, and then the mixture was ultrasonically emulsified and dispersed at 60° C. for 15 minutes under stirring. After substituting the inside of the flask with nitrogen, 1.6 g of an azo group-containing water-soluble initiator was further added as a polymerization initiator, and the resultant mixture was reacted at 60° C. for 8 hours to obtain an aqueous dispersion of a polymer. Thereafter, the dispersion was further diluted with pure water to prepare an aqueous dispersion having a solid content concentration of 30%.

Examples 8 to 11

The polymerization was carried out with the ingredients shown in Table 1 in the same manner as in Example 7 and after the polymerization, the dispersion was further diluted with pure water to prepare an aqueous dispersion having a solid content concentration of 30%.

Example 12

Into a 500 mL flask equipped with a nitrogen introduction tube, a thermometer, a stirring rod, and a reflux tube, 72.0 g of FMA, 21.0 g of C18SHA, 1 g of hydroxyethyl acrylate, 7.0 g of Siloxane A, and 170 g of toluene were charged, and stirred under a nitrogen stream at room temperature for 30 minutes. Subsequently, a solution prepared by dissolving 1.0 g of an azo group-containing water-soluble initiator as a polymerization initiator in 4 g of toluene was added, the temperature thereof was raised to 80° C., and the resultant mixture was reacted for 8 hours to obtain a toluene solution. After the polymerization, toluene was further added to prepare a toluene solution having a solid content concentration of 20%.

Examples 13 to 17

The polymerization was carried out with the ingredients shown in Table 2 in the same manner as in Example 12 and after the polymerization, the solution was diluted with toluene to prepare a toluene solution having a solid content concentration of 20%.

Comparative Example 1

The polymerization was carried out with the ingredients shown in Table 1 in the same manner as in Example 1, and after the polymerization, the dispersion was diluted with pure water to prepare an aqueous dispersion having a solid content concentration of 30%.

Comparative Example 2

The polymerization was carried out with the ingredients shown in Table 1 in the same manner as in Example 7, and after the polymerization, the dispersion was diluted with pure water to prepare an aqueous dispersion having a solid content concentration of 30%.

Comparative Example 3

The polymerization was carried out with the ingredients shown in Table 2 in the same manner as in Example 12, and after the polymerization, the solution was diluted with toluene to prepare a toluene solution having a solid content concentration of 20%.

TABLE 1

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Com. Ex. 1 | Com. Ex. 2 |
|---|---|---|---|---|---|---|---|---|---|---|---|---|---|
| 13FA | | | | 145 | 90.0 | 145 | | | 50.0 | | 50.0 | | |
| 13FMA | 145 | 145 | 145 | | | | 72.0 | | | 72.0 | | 145 | 72.0 |
| 13FCLA | | | | | 55.0 | | | 72.0 | 22.0 | | 22.0 | | |
| C18SHA | 42.9 | | | 42.9 | 42.9 | 28.0 | 21.0 | 21.0 | 15.5 | | | | |
| C18URA | | 42.9 | | | | | | | | 21.0 | | | |
| C18UreaA | | | 42.9 | | | 11.0 | | | | 5.5 | 11.0 | | |
| C18AAm | | | | | | | | | | | | | |
| C18MI | | | | | | | | | | | | | |
| StA | 15.0 | 15.0 | 15.0 | 15.0 | 15.0 | 15.0 | | | | | | 55.0 | 21.0 |
| IBMA | 22.9 | 22.9 | 22.9 | 22.9 | 22.9 | 22.9 | | | | | | 22.9 | |
| HEA | 1 | 1 | 1 | | | | | | | | | 1 | |
| 2-EHA | 1 | 1 | 1 | 1 | 1 | 1 | | | | | | 1 | |
| Siloxane A | 22.8 | 22.8 | 22.8 | | | | 14.0 | | | 14.0 | | 22.8 | 14.0 |
| VCM | 52.5 | 52.5 | 52.5 | 52.5 | 52.5 | 52.5 | | | | | | 52.5 | |
| Polymerization initiator | 3.2 | 3.2 | 3.2 | 3.2 | 3.2 | 3.2 | 1.6 | 1.6 | 1.6 | 1.6 | 1.6 | 3.2 | 1.6 |
| Co-solvent | 51.6 | 51.6 | 51.6 | 51.6 | 51.6 | 51.6 | 25.2 | 25.2 | 25.2 | 25.2 | 25.2 | 51.6 | 25.2 |
| Polyoxyethylene oleyl ether | 8.83 | 8.83 | 8.83 | 8.83 | 8.83 | 8.83 | 4.4 | 4.4 | 4.4 | 4.4 | 4.4 | 8.83 | 4.4 |
| Polyoxyethylene tridecyl ether | 8.83 | 8.83 | 8.83 | 8.83 | 8.83 | 8.83 | 4.4 | 4.4 | 4.4 | 4.4 | 4.4 | 8.83 | 4.4 |
| Pure water | 398 | 398 | 398 | 398 | 398 | 398 | 190 | 190 | 190 | 190 | 190 | 398 | 190 |

Numerals in the table denote weight (g)

TABLE 2

| | Ex. 12 | Ex. 13 | Ex. 14 | Ex. 15 | Ex. 16 | Ex. 17 | Com. Ex. 3 |
|---|---|---|---|---|---|---|---|
| 13FA | | | 50.0 | | | 50.0 | |
| 13FMA | 72.0 | | | 72.0 | 72.0 | | 72.0 |
| 13FCLA | | 72.0 | 22.0 | | | 22.0 | |
| C18SHA | 21.0 | 21.0 | 21.0 | | 15.5 | | |
| C18URA | | | | 21.0 | | | |
| C18UreaA | | | | | | | |
| C18AAm | | | | | 5.5 | | |
| C18MI | | | | | | 21.0 | |
| StA | | 7.0 | 7.0 | | | 7.0 | 21.0 |
| IBMA | | | | | | | 7.0 |
| HEA | 1 | 1 | 1 | 1 | 1 | 1 | 1 |
| 2-EHA | | 1 | 1 | | | 1 | |
| Siloxane A | 7.0 | | | 7.0 | 7.0 | | |
| Polymerization initiator | 1.0 | 1.0 | 1.0 | 1.0 | 1.0 | 1.0 | 1.0 |
| Toluene | 170 | 170 | 170 | 170 | 170 | 170 | 170 |

Numerals in the table denote weight (g)

Test Example 1

The aqueous dispersion having a solid content of 30% prepared in Example 1 was further diluted with water to prepare a treatment solution having a solid content of 0.9%. Polyester fabric (gray) and nylon fabric (black) were dipped in this treatment liquid, and then passed through a mangle. Wet pickups were about 65% (polyester fabric) and about 40% (nylon fabric). The treated fabrics were passed through a pin tenter at 170° C. for 1 minute, dried and cured. The test fabrics treated in this manner were evaluated for water repellency by a water repellency test according to the spray method of JIS L-1092. The results of water repellency are shown in Table 3. Moreover, the oil repellency was evaluated by the oil repellency test according to the AATCC test method 118-1992. The results of oil repellency are shown in Table 3. The evaluation results of water repellency and oil repellency of test fabrics dried with a tumbler (60° C. for 30 minutes) after washing the fabrics 10 times according to JIS L-0217 103, are also shown in Table 3.

Test Examples 2 to 11

The aqueous dispersion having a solid content of 30% prepared in Examples 2 to 11 was diluted with water in the same manner as in Test Example 1 (solid content concentration: 0.9%), and the fabrics were treated in the same manner as in Test Example 1. Table 3 shows the results of the water- and oil-repellency tests.

Comparative Test Examples 1 and 2

The aqueous dispersion having a solid content of 30% prepared in Comparative Examples 1 and 2 was diluted with water in the same manner as in Test Example 1 (solid content concentration: 0.9%), and the fabrics were treated in the same manner as in Test Example 1. Table 3 shows the results of the water- and oil-repellency tests.

Test Example 12

The toluene solution having a solid content concentration of 20% prepared in Example 12 was further diluted with toluene to prepare a treatment solution having a solid content concentration of 1.5%. Polyester fabric (gray) and nylon fabric (black) were dipped in this treatment liquid, and then lightly centrifuged for about 10 seconds. Wet pickups were about 55% (polyester fabric) and about 32% (nylon fabric). The treated fabrics were passed through a pin tenter at 170° C. for 1 minute, dried and cured. The treated fabrics were dried overnight at room temperature and then passed through the pin tenter at 170° C. for 1 minute for heat treatment.

The test fabrics treated in this way were evaluated for water repellency by the water repellency test according to the spray method of JIS L-1092. The results of water repellency are shown in Table 4. Moreover, the oil repellency was evaluated by the oil repellency test according to the AATCC test method 118-1992. The results of oil repellency are shown in Table 4.

Moreover, the evaluation results on oil repellency of test fabrics dried with a tumbler (60° C. for 30 minutes) after washing the fabrics 10 times according to JIS L-0217 103, are also shown in Table 4.

Test Examples 13 to 17

The toluene solution having a solid content of 20% prepared in Examples 13 to 17 was diluted with toluene in the same manner as in Test Example 12 (solid content concentration: 1.5%), and the fabrics were treated in the same manner as in Test Example 12. The results of the water- and oil-repellency tests are shown in Table 4.

Comparative Test Example 3

The toluene solution having a solid content concentration of 20% prepared in Comparative Example 3 was diluted with toluene in the same manner as in Test Example 12 (solid content concentration of 1.5%), and the fabrics were treated in the same manner as in Test Example 12. The results of the water- and oil-repellency tests are shown in Table 4.

TABLE 3

|  |  | Test Ex. 1 | Test Ex. 2 | Test Ex. 3 | Test Ex. 4 | Test Ex. 5 | Test Ex. 6 | Test Ex. 7 | Test Ex. 8 | Test Ex. 9 | Test Ex. 10 | Test Ex. 11 | Com. Test Ex. 1 | Com. Test Ex. 2 |
|---|---|---|---|---|---|---|---|---|---|---|---|---|---|---|
| Water repellency | Polyester fabric (Gray) | 100 | 100 | 100 | 90-100 | 100 | 100 | 100 | 100 | 90-100 | 100 | 90-100 | 90 | 80-90 |
|  | Nylon fabric (Black) | 100 | 90-100 | 90-100 | 90-100 | 100 | 100 | 100 | 90-100 | 90-100 | 90-100 | 90-100 | 80-90 | 80-90 |
|  | Nylon fabric (Black), after washing 10 times | 90 | 80-90 | 80 | 80-90 | 90 | 80-90 | 90 | 80-90 | 80 | 80-90 | 80 | 70 | 50 |
| Oil repellency | Polyester fabric (Gray) | 6 | 5 | 4 | 5 | 6 | 5 | 5 | 5 | 5 | 4 | 4 | 3 | 3 |
|  | Nylon fabric (Black) | 5-6 | 4 | 4 | 5 | 5-6 | 5 | 5 | 4 | 4 | 4 | 4 | 3 | 3 |
|  | Nylon fabric (Black), after washing 10 times | 4 | 3-4 | 3-4 | 4 | 5 | 5 | 4 | 4 | 4 | 4 | 4 | 2 | 1 |

TABLE 4

|  |  | Test Ex. 12 | Test Ex. 13 | Test Ex. 14 | Test Ex. 15 | Test Ex. 16 | Test Ex. 17 | Com. Test Ex. 3 |
|---|---|---|---|---|---|---|---|---|
| Water repellency | Polyester fabric (Gray) | 100 | 100 | 100 | 100 | 100 | 90-100 | 80-90 |
|  | Nylon fabric (Black) | 100 | 100 | 90-100 | 100 | 90-100 | 90-100 | 80-90 |
|  | Nylon fabric (Black), after washing 10 times | 90 | 80-90 | 80-90 | 80-90 | 80 | 80 | 50 |
| Oil repellency | Polyester fabric (Gray) | 6 | 5 | 6 | 6 | 5 | 6 | 3 |
|  | Nylon fabric (Black) | 5-6 | 5 | 5-6 | 5 | 4 | 5 | 3 |
|  | Nylon fabric (Black), after washing 10 times | 4-5 | 4 | 5 | 4-5 | 3-4 | 4 | 2 |

INDUSTRIAL APPLICABILITY

The surface treatment agent of the present disclosure can be used as, for example, a water repellent agent, an oil repellent agent, a soil resistant agent, a soil release agent, a peel agent and a mold release agent.

What is claimed is:

1. A surface treatment agent comprising:
   (A) a fluorine-containing polymer,
   (B) a liquid medium, and
   (C) a surfactant comprising a nonionic surfactant;
   wherein the surface treatment agent is an aqueous dispersion in which the fluorine-containing polymer (A) is dispersed in water or a mixture of water and an organic solvent, and
   wherein the fluorine-containing polymer (A) comprises:
   a first side chain having a fluoroalkyl group having 1 to 20 carbon atoms, and
   a second side chain having a monovalent hydrocarbon group having 7 to 40 carbon atoms, wherein
   the second side chain has a divalent —NH— group or a trivalent —N= group between the monovalent hydrocarbon group and a backbone chain, and
   the backbone chain is a backbone chain derived from an ethylenically unsaturated polymerizable group.

2. A surface treatment agent comprising:
   (A) a fluorine-containing polymer,
   (B) a liquid medium, and
   (C) a surfactant comprising a nonionic surfactant;
   wherein the surface treatment agent is an aqueous dispersion in which the fluorine-containing polymer (A) is dispersed in water or a mixture of water and an organic solvent,
   wherein the fluorine-containing polymer (A) comprises:
   (A1) a repeating unit derived from a fluorine-containing monomer which is an ethylenically unsaturated monomer having a fluoroalkyl group having 1 to 20 carbon atoms, and (A2) a repeating unit derived from a fluorine-free monomer which is an ethylenically unsaturated monomer having a monovalent hydrocarbon group having 7 to 40 carbon atoms and a divalent —NH— group or a trivalent —N=group.

3. A surface treatment agent comprising:
(A) a fluorine-containing polymer,
(B) a liquid medium, and
(C) a surfactant comprising a nonionic surfactant;
wherein the surface treatment agent is an aqueous dispersion in which the fluorine-containing polymer (A) is dispersed in water or a mixture of water and an organic solvent, and
wherein the fluorine-containing polymer (A) comprises (A1) a repeating unit derived from a fluorine-containing monomer, and (A2) a repeating unit derived from a fluorine-free monomer having a hydrocarbon group, wherein
the fluorine-containing monomer (A1) is a compound represented by formula:

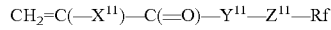

wherein $X^{11}$ is a hydrogen atom, a monovalent organic group or a halogen atom,
$Y^{11}$ is —O— or —NH—,
$Z^{11}$ is a direct bond or a divalent organic group, and
Rf is a fluoroalkyl group having 1 to 20 carbon atoms, and
the fluorine-free monomer having a hydrocarbon group (A2) is at least one monomer selected from the group consisting of
(A2-1) an amide group-containing monomer represented by formula:

wherein $R^{21}$ is an organic residue having an ethylenically unsaturated polymerizable group,
$R^{22}$ is a hydrocarbon group having 7 to 40 carbon atoms, and
$R^{23}$ is a hydrocarbon group having 1 to 5 carbon atoms,
(A2-2) a nitrogen-containing monomer represented by formula:

wherein $R^{31}$ is a hydrocarbon group having 7 to 40 carbon atoms,
$R^{32}$ is a hydrogen atom, a methyl group, or a halogen atom other than a fluorine atom,
$Y^{31}$ is —O— or —NH—,
$Y^{32}$ is —O—C(=O)—NH— or —NH—C(=O)—O— or —NH—C(=O)—NH—,
$Z^{31}$ is a divalent or trivalent hydrocarbon group having 1 to 5 carbon atoms, and
n is 1 or 2, and
(A2-3) an acrylamide monomer represented by formula:

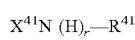

wherein $R^{41}$ is a hydrocarbon group having 7 to 40 carbon atoms,
$X^{41}$ is a monovalent group which is $CH_2$=C(—$R^{42}$)—C(=O)— wherein $R^{42}$ is a hydrogen atom or a methyl group, or a divalent group which is —C(=O)—CH=CH—C(=O)—, and
r is 0 when $X^{41}$ is divalent, or is 1 when $X^{41}$ is monovalent.

4. The surface treatment agent according to claim 3, wherein, in the fluorine-containing monomer (A1), $X^{11}$ is a hydrogen atom, a methyl group or a chlorine atom, $Y^{11}$ is —O—, $Z^{11}$ is a direct bond or an alkylene group having 1 to 20 carbon atoms, and Rf is a perfluoroalkyl group having 1 to 8 carbon atoms.

5. The surface treatment agent according to claim 2, wherein the fluorine-containing monomer (A1) is at least one compound selected from the group consisting of

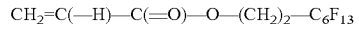

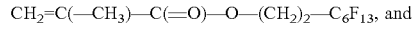

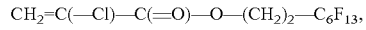

the fluorine-free monomer (A2-1) is at least one compound selected from the group consisting of palmitic acid amidoethyl (meth)acrylate and stearic acid amidoethyl (meth)acrylate,
the fluorine-free monomer (A2-2) is at least one compound selected from the group consisting of

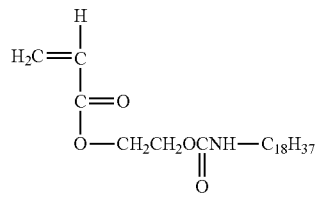

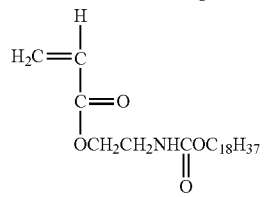

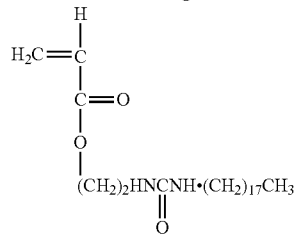

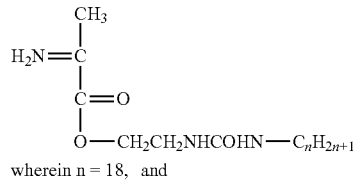

wherein n = 18, and

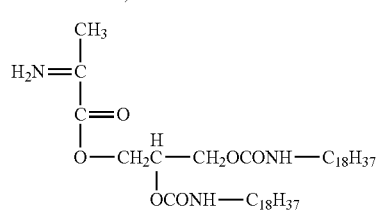

the fluorine-free monomer (A2-3) is at least one compound selected from the group consisting of lauryl (meth)acrylamide, cetyl (meth)acrylamide, stearyl (meth)acrylamide, behenyl (meth)acrylamide, N-lauryl maleimide, N-cetyl maleimide, N-stearyl maleimide, and N-behenyl maleimide.

6. The surface treatment agent according to claim 2, wherein the fluorine-containing polymer (A) further has a repeating unit derived from a further monomer (A3) other than the monomers (A1) and (A2), and the further monomer (A3) is at least one selected from the group consisting of
(A3-1) a repeating unit derived from a fluorine-free non-crosslinkable monomer, and
(A3-2) a repeating unit derived from a fluorine-free crosslinkable monomer.

7. The surface treatment agent according to claim 6, wherein the fluorine-free non-crosslinkable monomer (A3-1) is a compound represented by formula:

wherein A is a hydrogen atom, a methyl group, or a halogen atom other than a fluorine atom, T is a hydrogen atom, a chain or cyclic hydrocarbon group having 1 to 40 carbon atoms, or a chain or cyclic organic group having 1 to 41 carbon atoms and having an ester bond.

8. The surface treatment agent according to claim 6, wherein the fluorine-free non-crosslinkable monomer (A3-1) is at least one compound selected from the group consisting of stearyl (meth)acrylate and behenyl (meth)acrylate, and/or at least one compound selected from the group consisting of vinyl chloride, vinyl bromide, vinyl iodide, vinylidene chloride, vinylidene bromide and vinylidene iodide, and the fluorine-free crosslinkable monomer (A3-2) is at least one compound selected from the group consisting of diacetone acrylamide, (meth)acrylamide, N-methylol acrylamide, hydroxymethyl (meth)acrylate, hydroxyethyl (meth)acrylate, 3-chloro-2-hydroxypropyl (meth)acrylate, 2-acetoacetoxyethyl (meth)acrylate, N,N-dimethylaminoethyl (meth)acrylate, N,N-diethylaminoethyl (meth)acrylate, butadiene, isoprene, chloroprene and glycidyl (meth)acrylate.

9. The surface treatment agent according to claim 6, wherein an amount of the fluorine-containing monomer (A1) is 0.1 to 95% by weight, an amount of the fluorine-free monomer (A2) is 0.1 to 95% by weight, and an amount of the further monomer (A3) is 0 to 80% by weight, based on the fluorine-containing polymer (A).

10. The surface treatment agent according to claim 1, wherein the liquid medium (B) is a mixture of water and an organic solvent.

11. The surface treatment agent according to claim 1, wherein the surface treatment agent is a water repellent agent, an oil repellent agent, a soil resistant agent, a soil release agent, a peel agent, or a mold release agent.

12. A method for producing the surface treatment agent according to claim 2, comprising:

polymerizing a monomer mixture comprising the fluorine-containing monomer (A1) and the fluorine-free monomer having a hydrocarbon group (A2) in the presence of the liquid medium to obtain a dispersion or a solution of the fluorine-containing polymer (A).

13. A method for producing a treated substrate, comprising applying the surface treatment agent according to claim 1 to a substrate.

14. The surface treatment agent according to claim 6, wherein A is a halogen atom selected from a chlorine atom, a bromine atom, or an iodine atom.

* * * * *